United States Patent
Kotani et al.

(10) Patent No.: US 10,169,059 B2
(45) Date of Patent: Jan. 1, 2019

(54) ANALYSIS SUPPORT METHOD, ANALYSIS SUPPORTING DEVICE, AND RECORDING MEDIUM

(71) Applicant: FUJITSU LIMITED, Kawasaki-shi, Kanagawa (JP)

(72) Inventors: Ichiro Kotani, Nagoya (JP); Yasuhide Tobo, Chita (JP); Takaaki Nakazawa, Nagoya (JP); Yukihisa Miyagawa, Tsushima (JP); Yoshikazu Oda, Gifu (JP); Kenichi Mori, Aisai (JP); Naoki Tateishi, Nagoya (JP); Kenichi Shimazaki, Yokohama (JP); Kiyoshi Kouge, Kuwana (JP)

(73) Assignee: FUJITSU LIMITED, Kawasaki (JP)

( * ) Notice: Subject to any disclaimer, the term of this patent is extended or adjusted under 35 U.S.C. 154(b) by 796 days.

(21) Appl. No.: 14/293,277

(22) Filed: Jun. 2, 2014

(65) Prior Publication Data

US 2015/0007176 A1    Jan. 1, 2015

(30) Foreign Application Priority Data

Jun. 26, 2013  (JP) ................. 2013-133722

(51) Int. Cl.

| | | |
|---|---|---|
| G06F 9/455 | (2018.01) | |
| G06F 9/50 | (2006.01) | |
| G06F 9/48 | (2006.01) | |
| G06F 11/34 | (2006.01) | |

(52) U.S. Cl.
CPC ...... *G06F 9/45533* (2013.01); *G06F 9/45558* (2013.01); *G06F 9/4856* (2013.01); *G06F 9/5088* (2013.01); *G06F 11/3433* (2013.01); *G06F 11/3452* (2013.01); *G06F 11/3447* (2013.01); *G06F 11/3466* (2013.01); *G06F 2009/4557* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 9,128,742 B1 * | 9/2015 | Akolkar | .............. G06F 9/45558 |
| 2003/0046531 A1 | 3/2003 | Hiramoto | |
| 2007/0214261 A1 | 9/2007 | Kikuchi et al. | |

(Continued)

FOREIGN PATENT DOCUMENTS

| | | |
|---|---|---|
| JP | 2003-67352 | 3/2003 |
| JP | 2004-46734 | 2/2004 |
| JP | 2005-165673 | 6/2005 |

(Continued)

*Primary Examiner* — Qing Yuan Wu
(74) *Attorney, Agent, or Firm* — Staas & Halsey LLP

(57) ABSTRACT

An analysis support method includes: searching for a second physical machine that has a configuration similar to a first physical machine on which a first virtual machine to be analyzed is executed, the second physical machine having configurations similar to the first physical machine before and after a change of a state of a virtual machine executed on the second physical machine; and searching for a second virtual machine that is executed on the second physical machine and similar to the first virtual machine before and after the change of the state of the virtual machine.

16 Claims, 30 Drawing Sheets

(56) References Cited

U.S. PATENT DOCUMENTS

2010/0131957 A1    5/2010  Kami
2012/0023493 A1*   1/2012  Mori ................... G06F 9/45558
                                                          718/1

FOREIGN PATENT DOCUMENTS

JP      2010-277208        12/2010
WO      2006/046297 A1      5/2006
WO      2008/132924 A1     11/2008

* cited by examiner

FIG. 5

PHYSICAL MACHINE CONFIGURATION INFORMATION ~211

| PHYSICAL MACHINE ID | CPU OPERATIONAL FREQUENCY | NUMBER OF CPUs | MEMORY AMOUNT | DISK CAPACITY | |
|---|---|---|---|---|---|
| HostA | 3.0[GHz] | 8 | 16[GB] | 1[TB] | ~501-1 |
| HostB | 3.0[GHz] | 8 | 16[GB] | 1[TB] | ~501-2 |
| ... | ... | ... | ... | ... | |
| HostZ | 3.0[GHz] | 8 | 16[GB] | 1[TB] | ~501-3 |
| ... | ... | ... | ... | ... | |

| VIRTUAL MACHINE ID | CPU OPERATIONAL FREQUENCY | NUMBER OF CPUs | MEMORY AMOUNT | DISK CAPACITY | VIRTUAL MACHINE'S ROLE | |
|---|---|---|---|---|---|---|
| Guest0 | 1[GHz] | 1 | 1[GB] | 500[GB] | DB SERVER | 601-1 |
| Guest1 | 1[GHz] | 2 | 2[GB] | 100[GB] | Web SERVER | 601-2 |
| Guest2 | 1[GHz] | 2 | 2[GB] | 100[GB] | Web SERVER | 601-3 |
| Guest3 | 1[GHz] | 2 | 2[GB] | 100[GB] | Web SERVER | 601-4 |
| ... | ... | ... | ... | ... | ... | |
| GuestZ1 | 1[GHz] | 2 | 2[GB] | 100[GB] | Web SERVER | 601-5 |
| GuestZ2 | 1[GHz] | 2 | 2[GB] | 100[GB] | Web SERVER | 601-6 |
| GuestZ3 | 1[GHz] | 2 | 2[GB] | 100[GB] | AP SERVER | 601-7 |
| ... | ... | ... | ... | ... | ... | |

VIRTUAL MACHINE CONFIGURATION INFORMATION ~212

FIG. 7

OPERATIONAL INFORMATION LOG ~221

| TIME | MACHINE ID | CPU UTILIZATION | MEMORY UTILIZATION | DISK BUSY RATE | NUMBER OF TRANSACTIONS |
|---|---|---|---|---|---|
| 0:00, NOVEMBER 10, 2012 | Guest1 | 40[%] | 30[%] | 40[%] | 10 | ~701-1
| ... | ... | ... | ... | ... | ... |
| 0:00, NOVEMBER 10, 2012 | GuestZ1 | 10[%] | 30[%] | 10[%] | 20 | ~701-2
| 1:00, NOVEMBER 10, 2012 | Guest1 | 40[%] | 30[%] | 40[%] | 30 | ~701-3
| ... | ... | ... | ... | ... | ... |
| 1:00, NOVEMBER 10, 2012 | GuestZ1 | 10[%] | 30[%] | 10[%] | 10 | ~701-4
| ... | ... | ... | ... | ... | ... |

FIG. 8

CONFIGURATION CHANGE RECORD ~222

| CASE ID | PHYSICAL MACHINE ID 1 | VIRTUAL MACHINE ID LIST 1 | PHYSICAL MACHINE ID 2 | VIRTUAL MACHINE ID LIST 2 | CHANGED VIRTUAL MACHINE ID | CHANGE TYPE | TIME AND DATE | |
|---|---|---|---|---|---|---|---|---|
| Case1 | HostA | Guest1 Guest2 | | | Guest0 | DELETION | 20:00, SEPTEMBER 10, 2012 | ~801-1 |
| Case2 | HostA | Guest1 Guest2 | | | Guest3 | ADDITION | 15:00, OCTOBER 10, 2012 | ~801-2 |
| CaseZ0 | HostZ | GuestZ1 | | | GuestZ2 | ADDITION | 24:00, OCTOBER 10, 2012 | ~801-3 |
| Case3 | HostB | Guest4 Guest5 | | | Guest6 | ADDITION | 18:00, OCTOBER 15, 2012 | ~801-4 |
| Case4 | HostC | Guest7 | HostD | Guest8 | Guest9 | MIGRATION | 23:00, OCTOBER 15, 2012 | ~801-5 |
| Case5 | HostE | Guest10 Guest11 | | | Guest12 | ADDITION | 21:00, OCTOBER 16, 2012 | ~801-6 |
| ... | ... | ... | ... | ... | ... | ... | ... | |
| CaseZ | HostZ | GuestZ1 GuestZ2 | | | GuestZ3 | ADDITION | 24:00, NOVEMBER 11, 2012 | ~801-7 |
| ... | ... | ... | ... | ... | ... | ... | ... | |

FIG. 10A
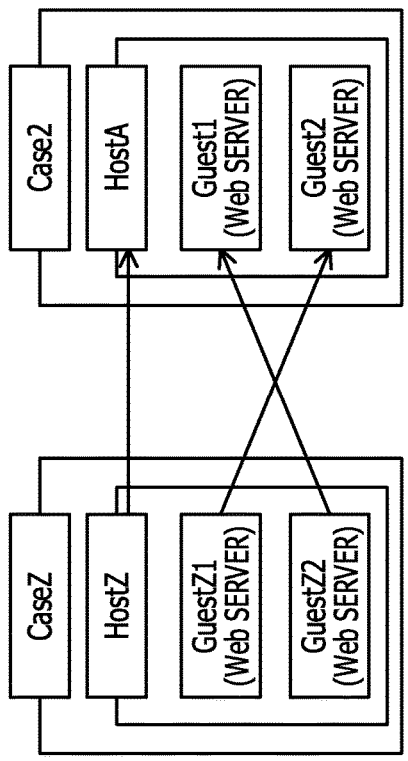
FIG. 10B
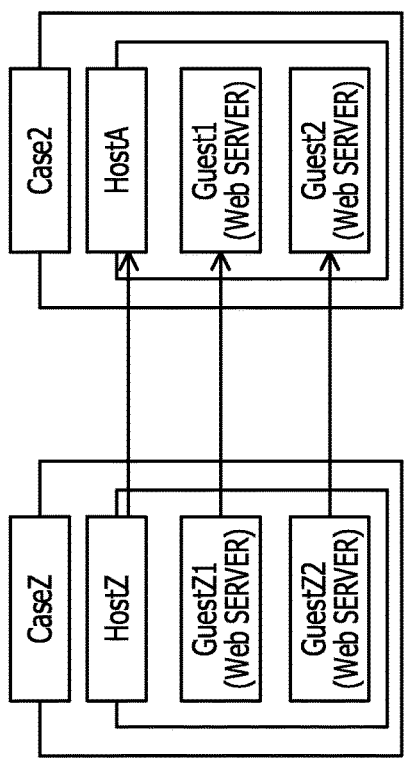
FIG. 10C
| CANDIDATE NUMBER | CASE ID | PHYSICAL MACHINE ID 1 | VIRTUAL MACHINE ID 1 | VIRTUAL MACHINE ID 2 | SIMILARITY |
|---|---|---|---|---|---|
| 0 | CaseZ | HostZ | GuestZ1 | GuestZ2 | ~1001-1 |
| 1 | Case2 | HostA | Guest1 | Guest2 | ~1001-2 |
| 2 | Case2 | HostA | Guest2 | Guest1 | ~1001-3 |
| 3 | Case3 | HostB | Guest4 | Guest5 | ~1001-4 |
| 4 | Case3 | HostB | Guest5 | Guest4 | ~1001-5 |
SIMILARITY LIST ~1001

FIG. 12

SIMILARITY BETWEEN PHYSICAL MACHINES (PHYSICAL MACHINE TO BE COMPARED AND CANDIDATE PHYSICAL MACHINE TO BE COMPARED) = SIMILARITY BETWEEN OPERATIONAL TRENDS OF CPU UTILIZATION + SIMILARITY BETWEEN OPERATIONAL TRENDS OF MEMORY UTILIZATION + SIMILARITY BETWEEN OPERATIONAL TRENDS OF DISK BUSY RATES ... (2)

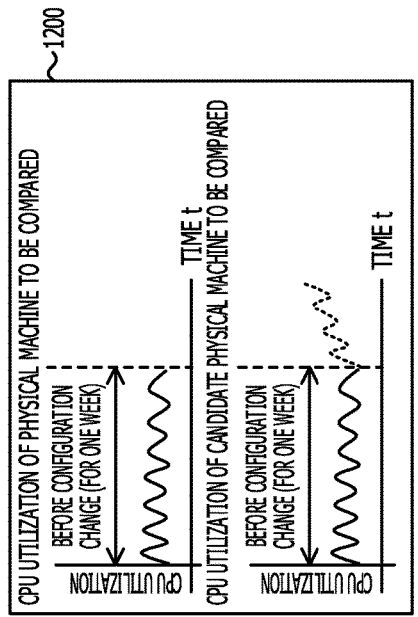

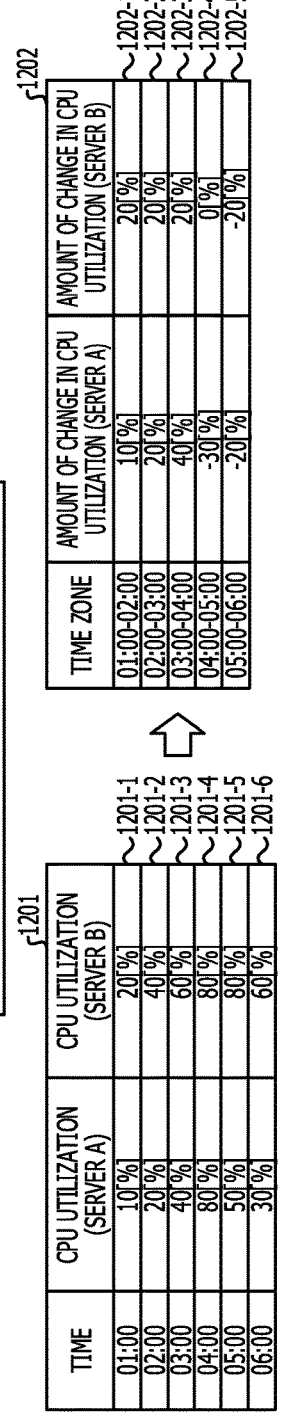

| TIME | CPU UTILIZATION (SERVER A) | CPU UTILIZATION (SERVER B) |
|---|---|---|
| 01:00 | 10% | 20% |
| 02:00 | 20% | 40% |
| 03:00 | 40% | 60% |
| 04:00 | 80% | 80% |
| 05:00 | 50% | 80% |
| 06:00 | 30% | 60% |

| TIME ZONE | AMOUNT OF CHANGE IN CPU UTILIZATION (SERVER A) | AMOUNT OF CHANGE IN CPU UTILIZATION (SERVER B) |
|---|---|---|
| 01:00-02:00 | 10% | 20% |
| 02:00-03:00 | 20% | 20% |
| 03:00-04:00 | 40% | 20% |
| 04:00-05:00 | -30% | 0% |
| 05:00-06:00 | -20% | -20% |

SIMILARITY BETWEEN OPERATIONAL TRENDS = $1/\sqrt{\Sigma}$ ((AMOUNT OF CHANGE OF PHYSICAL MACHINE TO BE COMPARED IN EACH TIME ZONE - AMOUNT OF CHANGE OF CANDIDATE PHYSICAL MACHINE TO BE COMPARED IN EACH TIME ZONE) ^ 2) ... (3)

SIMILARITY BETWEEN OPERATIONAL TRENDS OF CPU UTILIZATION = $1/\sqrt{((10-20)^2+(20-20)^2+(40-20)^2+(-30-0)^2+(-20-(-20))^2)}$ = 0.16

FIG. 14

STANDARD SIMILARITY = STANDARD SIMILARITY FOR PHYSICAL MACHINE (PHYSICAL MACHINE TO BE COMPARED) + Σ STANDARD SIMILARITIES FOR VIRTUAL MACHINES (VIRTUAL MACHINES n TO BE COMPARED) ... (6)

STANDARD SIMILARITY FOR PHYSICAL MACHINE (PHYSICAL MACHINE TO BE COMPARED) =
STANDARD SIMILARITY FOR OPERATIONAL TREND OF CPU UTILIZATION + STANDARD SIMILARITY FOR OPERATIONAL TREND OF MEMORY UTILIZATION + STANDARD SIMILARITY FOR OPERATIONAL TREND OF DISK BUSY RATE ... (7)

STANDARD SIMILARITY FOR VIRTUAL MACHINE (VIRTUAL MACHINE TO BE COMPARED) =
DEGREE OF IMPORTANCE OF CPU * STANDARD SIMILARITY FOR OPERATIONAL TREND OF CPU UTILIZATION + DEGREE OF IMPORTANCE OF MEMORY * STANDARD SIMILARITY FOR OPERATIONAL TREND OF MEMORY UTILIZATION + DEGREE OF IMPORTANCE OF DISK * STANDARD SIMILARITY FOR OPERATIONAL TREND OF DISK BUSY RATE ... (8)

1401

| DAY | TIME ZONE | FIRST WEEK | SECOND WEEK | THIRD WEEK | ... | AVERAGE | STANDARD CHANGE AMOUNT |
|---|---|---|---|---|---|---|---|
| SUNDAYS | 00:00-01:00 | 5[%] | 10[%] | 5[%] | ... | 6[%] | 7.5[%] | ~1401-1
|  | 01:00-02:00 | 10[%] | 20[%] | 10[%] | ... | 13[%] | 16.3[%] | ~1401-2
|  | ... | ... | ... | ... | ... | ... | ... |
| MONDAYS | 00:00-01:00 | 20[%] | 30[%] | 20[%] | ... | 23[%] | 28.6[%] | ~1401-3
|  | ... | ... | ... | ... | ... | ... | ... |
| ... |  |  |  |  |  |  |  |

STANDARD SIMILARITY FOR OPERATIONAL TREND = $1/\sqrt{\Sigma((\text{AVERAGE IN EACH TIME ZONE} - \text{STANDARD CHANGE AMOUNT IN EACH TIME ZONE})^2)}$ ... (9)

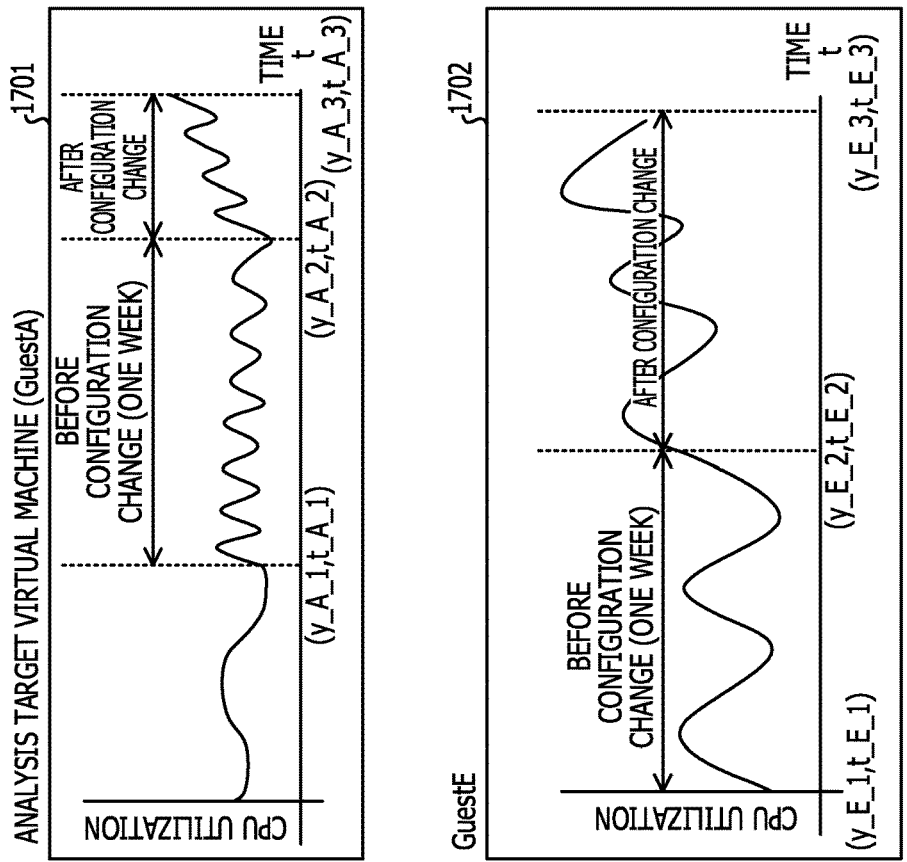
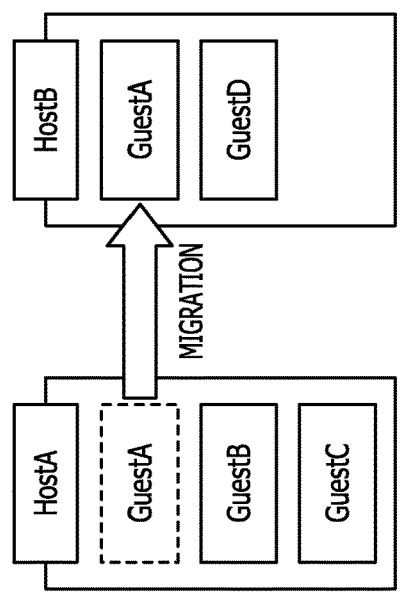
FIG. 17A
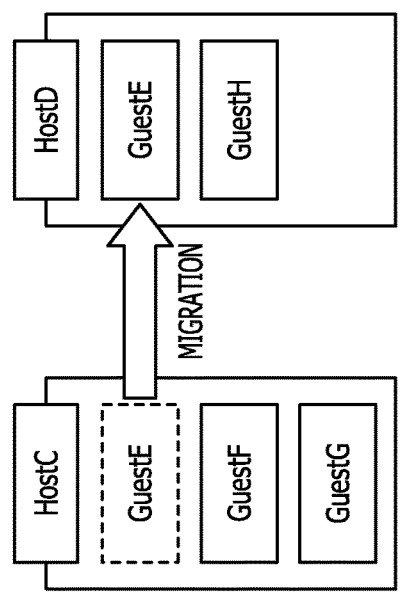
FIG. 17B

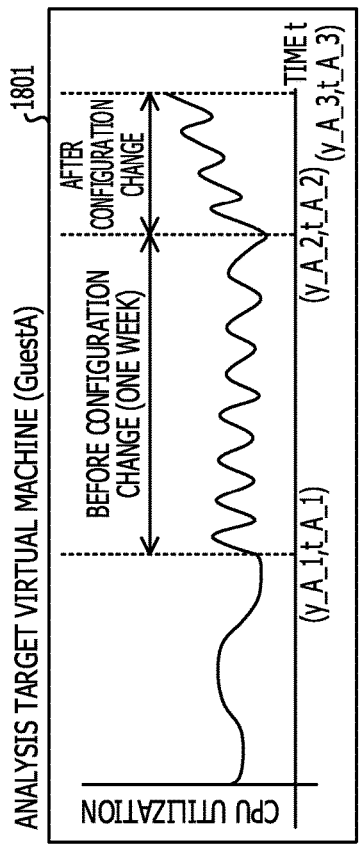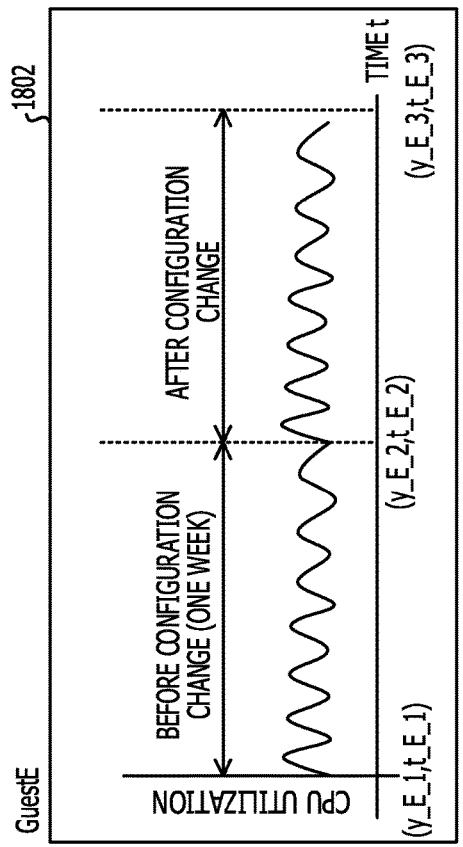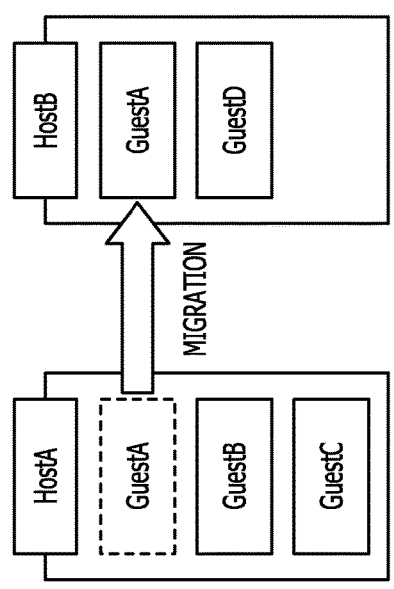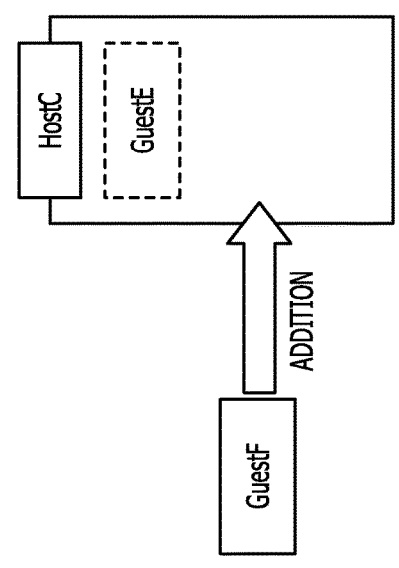
FIG. 18A
FIG. 18B

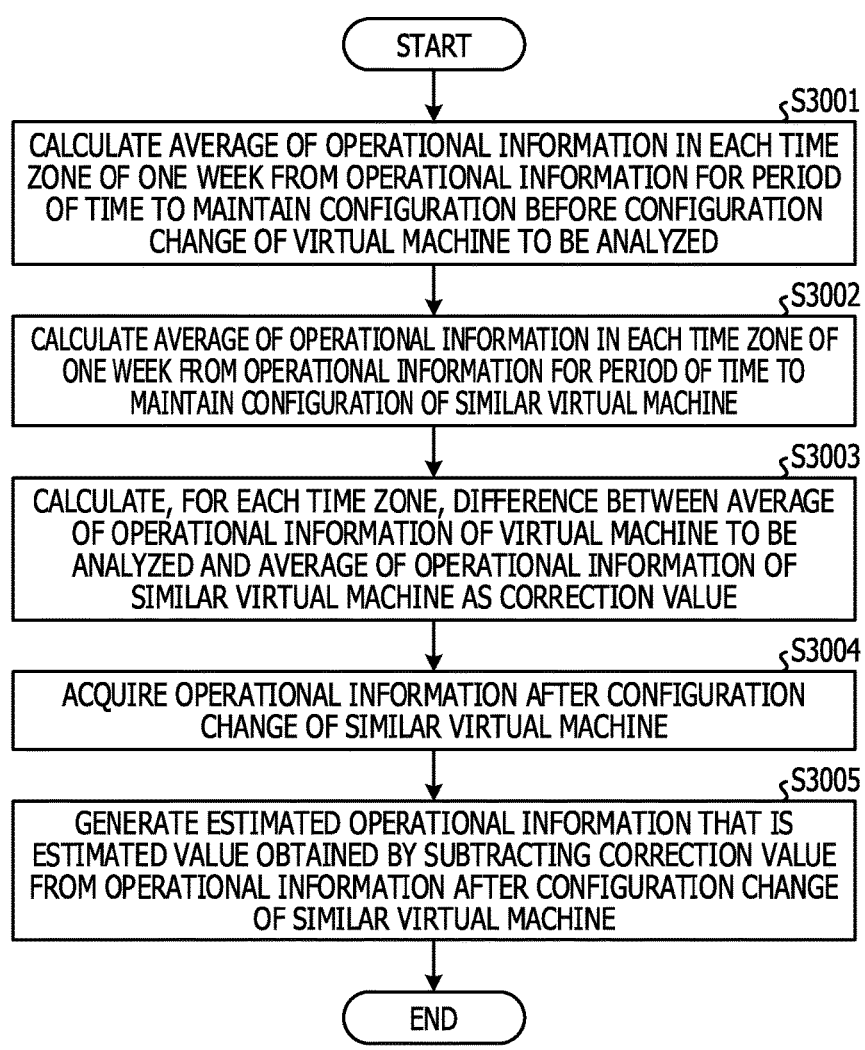

ANALYSIS SUPPORT METHOD, ANALYSIS SUPPORTING DEVICE, AND RECORDING MEDIUM

CROSS-REFERENCE TO RELATED APPLICATION

This application is based upon and claims the benefit of priority of the prior Japanese Patent Application No. 2013-133722 filed on Jun. 26, 2013, the entire contents of which are incorporated herein by reference.

FIELD

The embodiment discussed herein is related to an analysis support method, an analysis supporting device, and a recording medium.

BACKGROUND

Traditionally, a technique for analyzing a usage status of a hardware resource used by a virtual machine executed on a physical machine is known. In order to maintain the accuracy of analysis results at a certain level, data of the usage status measured for a certain time period or more is requested as data to be analyzed. A configuration of the physical machine is changed by adding a virtual machine to the physical machine or deleting a virtual machine from the physical machine.

As related art, the following techniques are known. The first technique is to select performance data of an information processing device corresponding to an information processing system similar to the configuration of an information processing system to be newly built and measure the performance of the information processing system based on the performance data. The second technique is to estimate the performance of a web system in accordance with a parameter input as an input item, a model pattern within a system model database (DB), a system characteristic, a function characteristic, and response time prediction model information. The third technique is to estimate average delay times of servers using central processing unit (CPU) utilization of the servers included in a computer system and the frequency of requests by a user of the computer system. The fourth technique is to calculate an appropriate value of a resource of a virtual machine based on configuration information of the virtual machine, operational record information of the resource, and non-operation information of the resource and issue a command to migrate the virtual machine based on the calculated appropriate value of the resource. The fifth technique is to periodically acquire CPU utilization, information of input and output (I/O) loads, and the like after a constituent element that constitutes a part of a computer system is changed. The sixth technique uses history records of information of an assignment of a resource to a virtual machine.

As examples of related art, Japanese Laid-open Patent Publications Nos. 2003-67352, 2004-46734, 2005-165673 and 2010-277208, and International Publication Pamphlet Nos. WO2006/46297 and WO2008/132924 are known.

SUMMARY

According to an aspect of the invention, an analysis support method includes: searching for a second physical machine that has a configuration similar to a first physical machine on which a first virtual machine to be analyzed is executed, the second physical machine having configurations similar to the first physical machine before and after a change of a state of a virtual machine executed on the second physical machine; and searching for a second virtual machine that is executed on the second physical machine and similar to the first virtual machine before and after the change of the state of the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of stored details of physical machine configuration information;

FIG. 7 illustrates an example of stored details of an operational information log;

FIG. 8 illustrates an example of stored details of a configuration change record;

FIGS. 10A, 10B, and 10C illustrate an example of generation of a similarity list from the similar case list;

FIG. 12 illustrates an example of calculation of a similarity between physical machines;

FIG. 14 illustrates an example of calculation of a standard similarity;

FIGS. 17A and 17B illustrate an example of analysis executed using a virtual machine of which configuration information is the same as a virtual machine to be analyzed and of which a configuration change is the same as the virtual machine to be analyzed;

FIGS. 18A and 18B illustrate an example of analysis executed using a virtual machine of which a trend of operational information is similar to the virtual machine to be analyzed before a configuration change of the virtual machine to be analyzed;

FIG. 30 is a flowchart of an example of a procedure for a process of generating estimated operational information.

DESCRIPTION OF EMBODIMENT

According to the conventional techniques, when an operational trend of a virtual machine for which data to be used to maintain the accuracy of analysis at a certain level is not measured is to be analyzed based on measured data of another virtual machine, it is difficult to determine measured data of a virtual machine in order to execute the analysis based on the determined measured data.

According to an aspect, an object of this disclosure is to provide an analysis support method and an analysis supporting device that enable searching of a virtual machine of which an operational trend is similar to a virtual machine to be analyzed and to provide a recording medium storing an analysis support program to be used to search for a virtual machine of which an operational trend is similar to a virtual machine to be analyzed.

Hereinafter, an embodiment of the analysis support method disclosed herein, the analysis supporting device disclosed herein, and the recording medium disclosed herein and storing the analysis support program is described in detail with reference to the accompanying drawings.

Figure 1:
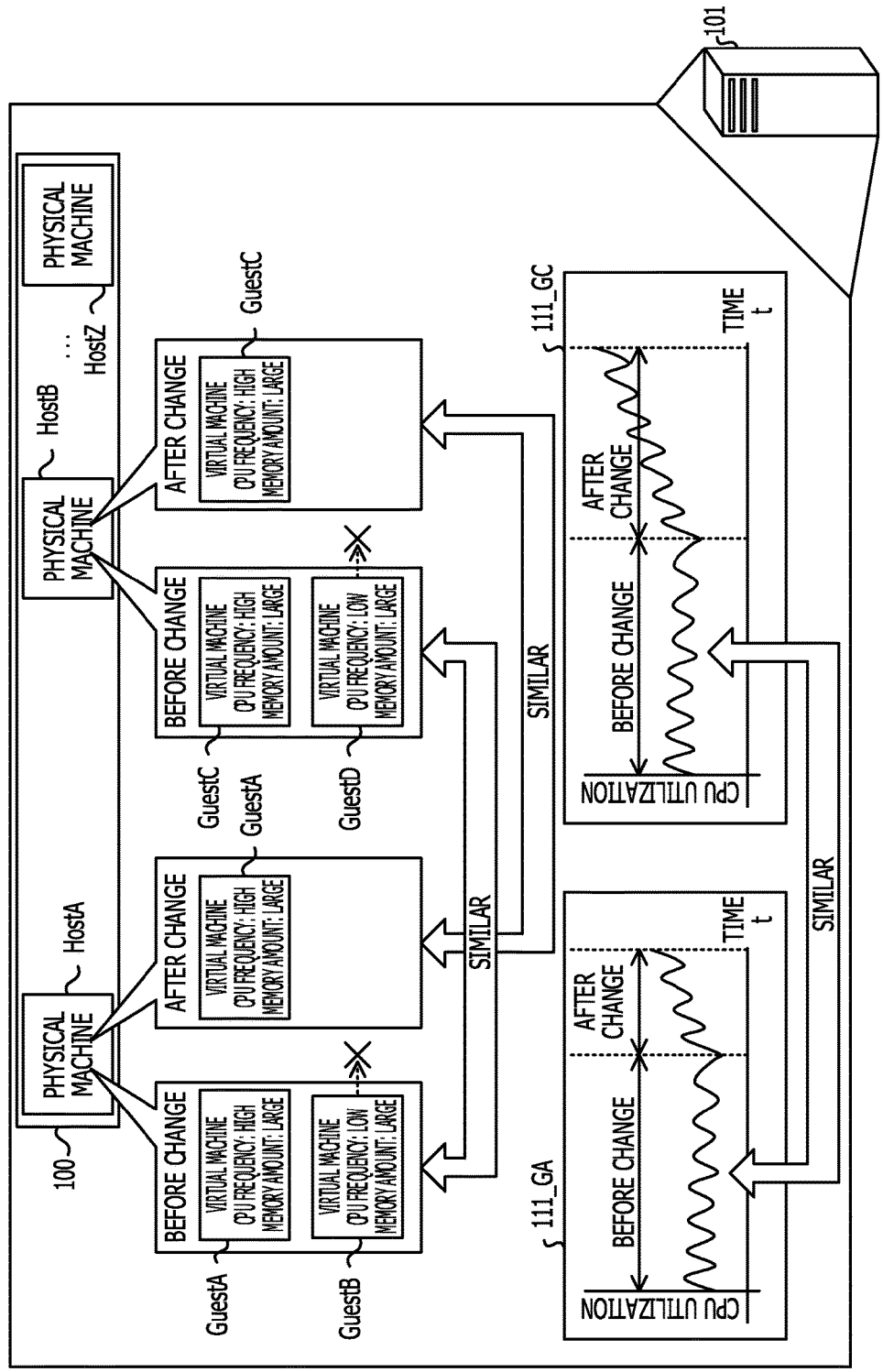
FIG. 1 illustrates an example of operations executed in an analysis support method according to an embodiment.

FIG. 1 illustrates an example of operations executed in an analysis support method according to the embodiment. An analysis supporting device 111 that is configured to execute the analysis support method is a computer that supports a process of analyzing operational information of virtual machines included in a system 100. The system 100 includes physical machines HostA to HostZ.

The physical machines HostA to HostZ are computers that each operate using hardware resources that are, for example, a central processing unit (CPU), a memory, a disk, and the like. The physical machines HostA to HostZ execute virtual machines GuestA to GuestD.

The virtual machines GuestA to GuestD are virtual computers that are each executed on any of the physical machines HostA to HostZ. For example, the virtual machines GuestA and GuestB are virtual computers that are executed on the physical machine HostA. Units of the virtual machines GuestA to GuestD include software such as programs or operating systems (OSs), variables provided to software, and information identifying hardware resources that are to be assigned to the virtual machines in order to execute software, for example.

The hardware resources are more effectively used by building the system including the virtual machines than if the hardware resources are included in a system only including the physical machines. An analyzing device that is configured to analyze the virtual machines included in the system 100 analyzes operational trends of the virtual machines using operational information including utilization of hardware resources used by the virtual machines. Hereinafter, a virtual machine to be analyzed is referred to as an "analysis target virtual machine" in some cases. The analyzing device uses an analysis result to propose migration of an analysis target virtual machine to another physical machine, addition of a physical machine, and the like.

When a cloud environment is increased, configurations of the virtual and physical machines may be frequently changed by adding, migrating, or deleting a virtual machine. If such a configuration change occurs, trends of operational information of virtual machines may change. Thus, results of analysis executed using operational information of the virtual machines before the change and operational information of virtual machines after the change may not be accurate, and the accuracy of the analysis may be reduced. If the analysis is executed using operational information of the virtual machines after the change without using the operational information of the virtual machines before the change, a sufficient amount of data may not be obtained, and the accuracy of the analysis may be reduced.

To avoid this, the analysis support device 101 searches for a virtual machine of which operational information before a change is similar to an analysis target virtual machine from among virtual machines executed on a physical machine including virtual machines of which a configuration before and after the change is similar to a configuration of virtual machines on a physical machine on which the analysis target virtual machine is executed. Thus, the analysis support device 101 detects the virtual machine of which an operational trend may be the same as or similar to the analysis target virtual machine after the change.

FIG. 1 illustrates a state in which the physical machine HostA executes the virtual machine GuestB and the virtual machine GuestA that is an analysis target virtual machine, and the virtual machine GuestB is deleted by a configuration change. A CPU frequency that is among CPU frequencies to be assigned to the virtual machines and is relatively high is assigned to the virtual machine GuestA. A memory amount that is a part of a memory amount to be assigned to the virtual machines and is relatively large is assigned to the virtual machine GuestA. A CPU frequency that is among the CPU frequencies to be assigned to the virtual machines and is relatively low is assigned to the virtual machine GuestB. A memory amount that is a part of the memory amount to be assigned to the virtual machines and is relatively large is assigned to the virtual machine GuestB. Information that identifies configurations of the physical machine HostA before and after the change of the virtual machine and configurations of the virtual machines executed on the physical machine HostA before and after the change is stored as first configuration information in a storage region accessible from the analysis support device 101. A specific example of stored details of the first configuration information is described later with reference to FIG. 8.

In addition, FIG. 1 illustrates a state in which the physical machine HostB executes the virtual machine GuestC and the virtual machine GuestD, and the virtual machine GuestD is deleted by a configuration change. A CPU frequency that is among CPU frequencies to be assigned to the virtual machines and is relatively high is assigned to the virtual machine GuestC. A memory amount that is a part of a memory amount to be assigned to the virtual machines and is relatively large is assigned to the virtual machine GuestC. A CPU frequency that is among the CPU frequencies to be assigned to the virtual machines and is relatively low is assigned to the virtual machine GuestD. A memory amount that is a part of the memory amount to be assigned to the virtual machines and is relatively large is assigned to the virtual machine GuestD. Information that identifies configurations of the physical machine HostB before and after the change of the virtual machine and configurations of the virtual machines executed on the physical machine HostB before and after the change is stored as second configuration information in a storage region accessible from the analysis support device 101. A specific example of stored details of the second configuration information is described later with reference to FIG. 8.

The analysis support device 101 references the second configuration information and searches for, based on the first configuration information, a second physical machine of which configurations before and after the changes are similar to the physical machine HostA on which the analysis target virtual machine is executed. In the example illustrated in FIG. 1, the analysis supporting device 101 detects the physical machine HostB as the second physical machine. The analysis supporting device 101 determines that the configurations of the virtual machines GuestA and GuestC before the changes are similar to each other and the configurations of the virtual machines GuestB and GuestD before the changes are similar to each other as the configurations of the physical machines before the changes. In addition, the analysis supporting device 101 determines that the configuration of the virtual machine GuestA is similar to the configuration of the virtual machine GuestC as the configurations of the physical machines before the changes. A specific example of the determination of the similarities is described later with reference to FIG. 9.

When the physical machine HostB is searched, the analysis supporting device 101 searches for a similar virtual machine that is a second virtual machine among virtual machines executed on the second physical machine before and after the change and of which operational information before the change is similar to a first virtual machine. The analysis supporting device 101 references operational information of the virtual machines executed on the physical machine HostB before the change and searches for the similar virtual machine based on operational information of the virtual machine GuestA before the change.

In the example illustrated in FIG. 1, the analysis supporting device 101 determines that operational information that is before the change and included in operational information 111_GC of the virtual machine GuestC executed on the physical machine HostB before and after the change is similar to operational information that is before the change and is included in operational information 111_GA of the virtual machine GuestA. FIG. 1 illustrates that a trend of a change in the operational information that is before the change and included in the operational information 111_GC matches a trend of a change in the operational information that is before the change and included in the operational information 111_GA. A specific example of the determination of the similarity is described later with reference to FIGS. 10A, 10B, 10C, 11, 12, 13, 14, and 15.

Description of Cloud System

Next, a case where the system 100 illustrated in FIG. 1 is applied to a cloud system is described. In the cloud system, the analysis supporting device 101 is applied to a device configured to analyze virtual machines.

Figure 2:
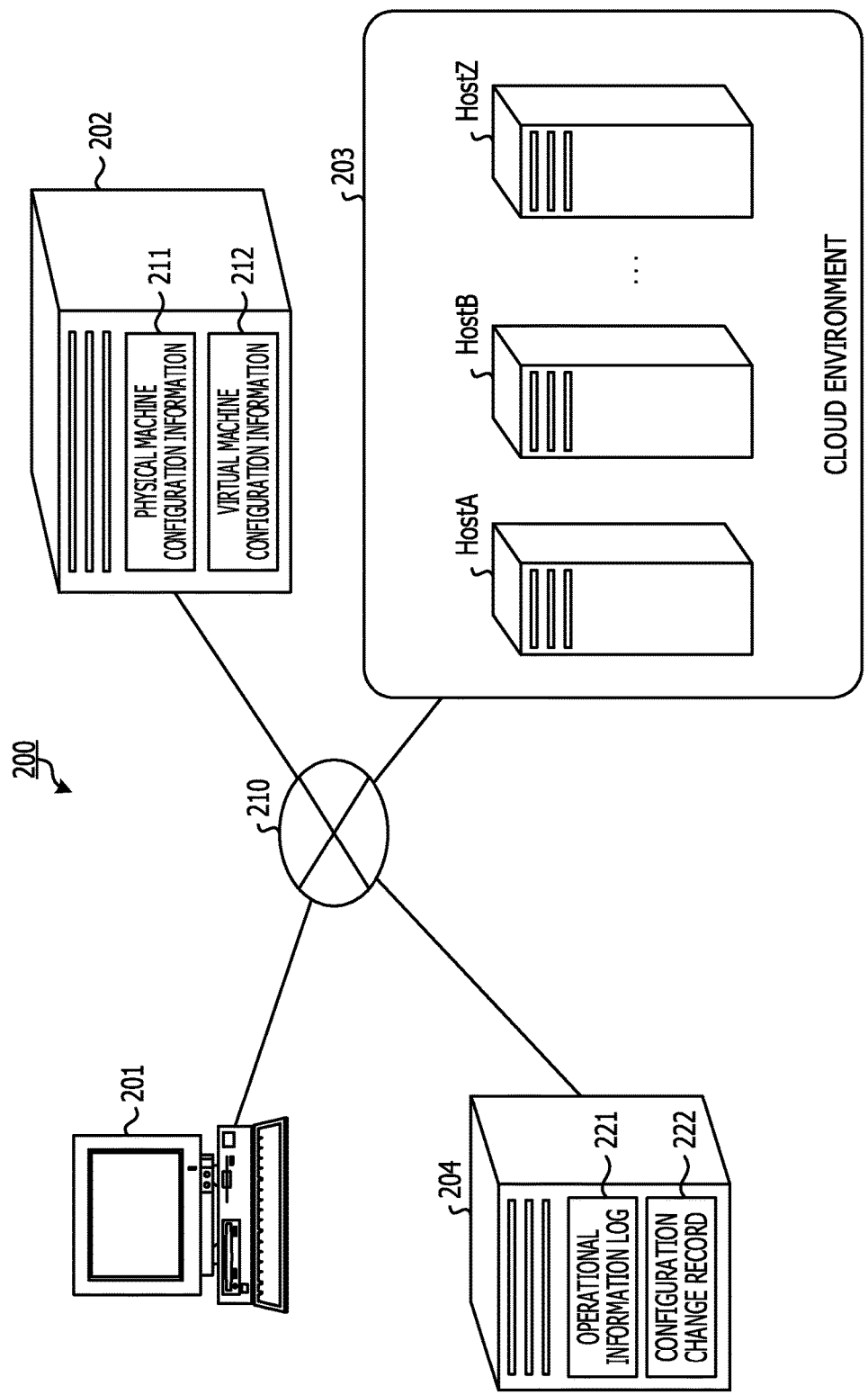
FIG. 2 illustrates an example of connections within a cloud system.

FIG. 2 illustrates an example of connections in the cloud system. A cloud system 200 includes an administrator apparatus 201, a configuration management server 202, a cloud environment 203, and an analyzing device 204. The administrator apparatus 201, the configuration management server 202, the cloud environment 203, and the analyzing device 204 are coupled to each other through a network 210. The configuration management server 202 includes physical machine configuration information 211 and virtual machine configuration information 212. The cloud environment 203 includes the physical machines HostA to HostZ. The analyzing device 204 includes an operational information log 221.

The administrator apparatus 201 is a device that is operated by an administrator who manages the cloud system 200. The administrator apparatus 201 issues a request to analyze an analysis target virtual machine included in the cloud system 200 in accordance with an operation of the administrator and displays a result of the analysis.

The configuration management server 202 is a device that manages the physical machines HostA to HostZ of the cloud system 200. The configuration management server 202 instructs the physical machines HostA to HostZ to add, delete, and migrate a virtual machine. After the instructions are provided to the physical machines HostA to HostZ, the configuration management server 202 updates the physical machine configuration information 211 and the virtual machine configuration information 212. An example of stored details of the physical machine configuration information 211 is described later with reference to FIG. 5. An example of stored details of the virtual machine configuration information 212 is described later with reference to FIG. 6.

The cloud environment 203 includes the physical machines HostA to HostZ. The physical machines HostA to HostZ execute virtual machines. The physical machines HostA to HostZ included in the cloud environment 203 are accessed by a user apparatus coupled to the cloud system 200. The virtual machines each periodically collect, as operational information, CPU utilization, memory utilization, a disk busy rate, and the number of transactions and cause the collected operational information to be stored in the analyzing device 204.

The analyzing device 204 is configured to analyze, based on the operational information log 221, the operational information of the virtual machines included in the cloud system 200. An example of stored details of the operational information log 221 is described later with reference to FIG. 7. If the operational information log 221 does not have sufficient information to execute analysis, the analyzing device 204 searches for a virtual machine similar to the analysis target virtual machine from among the virtual machines executed on the physical machines HostA to HostZ. If the similar virtual machine is detected, the analyzing device 204 analyzes performance of the similar virtual machine.

Hardware of Analyzing Device 204

Figure 3:
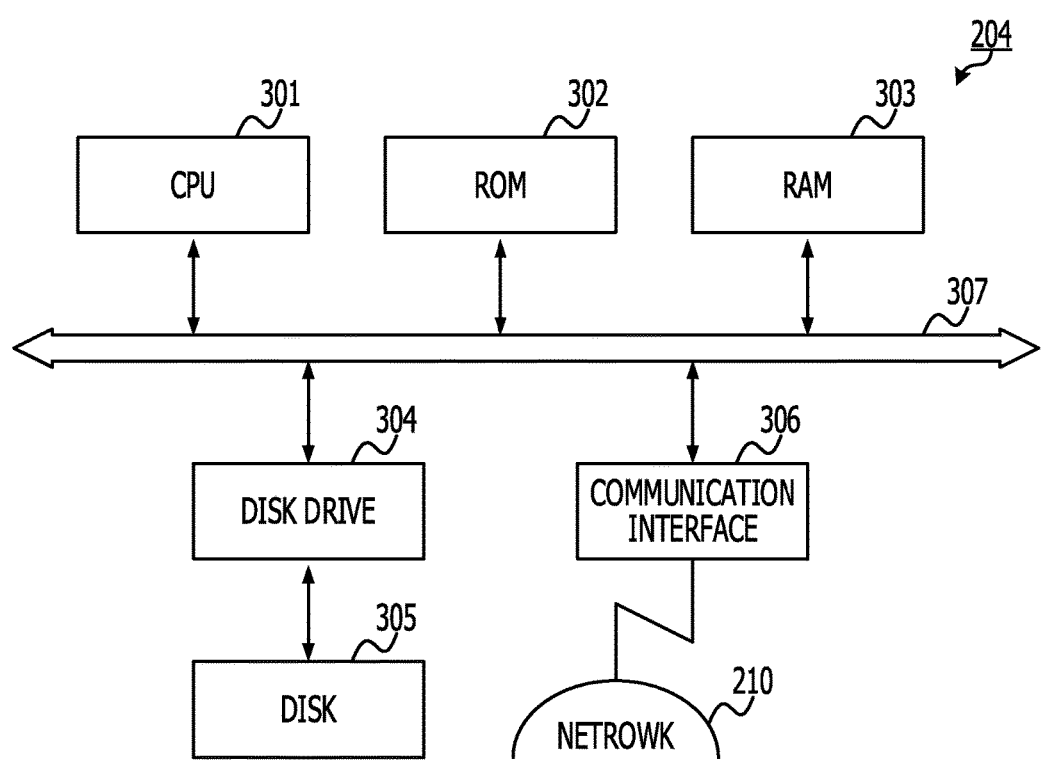
FIG. 3 illustrates an example of a hardware configuration of an analyzing device.

FIG. 3 illustrates an example of a hardware configuration of the analyzing device. FIG. 3 describes the example of the hardware configuration of the analyzing device 204. As illustrated in FIG. 3, the analyzing device 204 includes a CPU 301, a read-only memory (ROM) 302, a random access memory (RAM) 303, a disk drive 304, a disk 305, and a communication interface 306. The CPU 301, the ROM 302, the RAM 303, the disk drive 304, and the communication interface 306 are coupled to each other by a bus 307.

The CPU 301 is an arithmetic processing device configured to control the overall analyzing device 204. The ROM 302 is a nonvolatile memory storing programs such as a boot program. The RAM 303 is a volatile memory to be used as a work area of the CPU 301.

The disk drive 304 is a control device configured to control reading and writing of data from and in the disk 305 in accordance with control of the CPU 301. As the disk drive 304, a magnetic disk drive, a solid state drive, or the like may be used. The disk 305 is a nonvolatile memory for storing data written in accordance with control of the disk drive 304. For example, if the disk drive 304 is a magnetic disk drive, a magnetic disk is used as the disk 305. If the disk drive 304 is a solid state drive, a semiconductor element memory is used as the disk 305.

The communication interface 306 serves as an internal interface with the network 210 and is a control device configured to control reception and output of data from and to another device. The communication interface 306 is coupled to the other device through a communication line and the network 210. As the communication interface 306, a modem, a local area network (LAN) adapter, or the like may be used, for example.

The configuration management server 202 and the physical machines HostA to HostZ each have the same configuration as the analyzing device 204. The administrator apparatus 201 includes a CPU, a ROM, a RAM, a disk drive, a disk, a keyboard, and a mouse.

Functional Configuration of Analyzing Device 204

Figure 4:
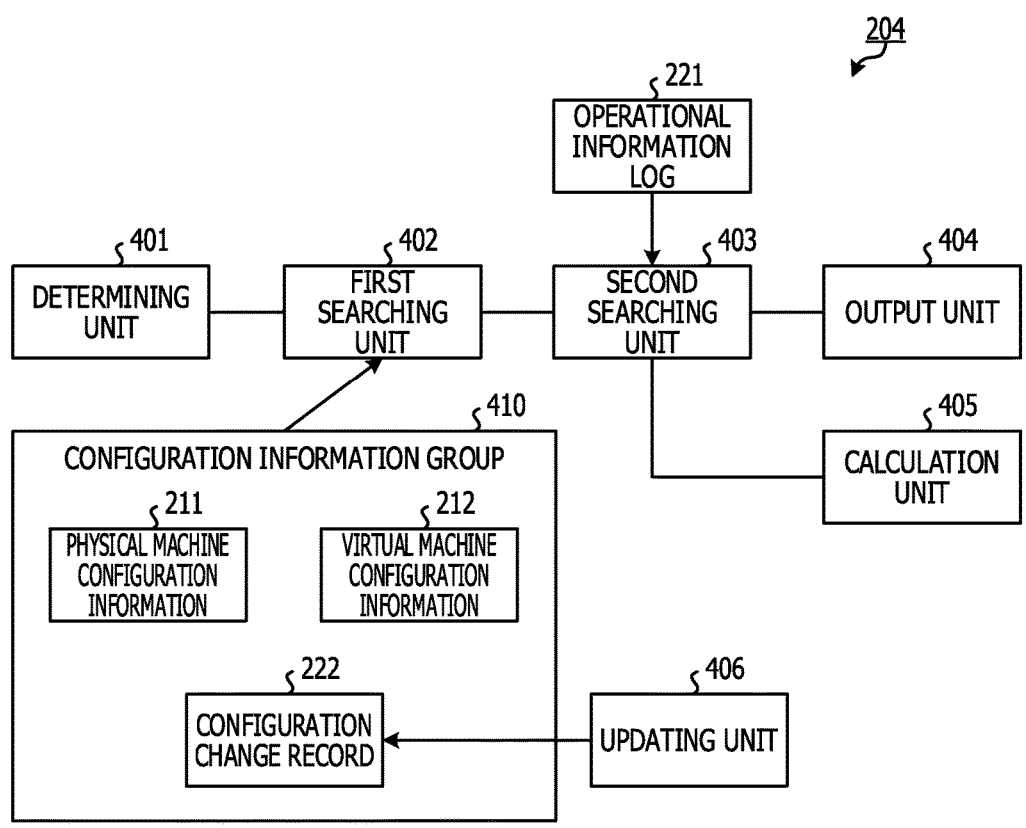
FIG. 4 illustrates an example of a functional configuration of the analyzing device.

Next, a functional configuration of the analyzing device 204 is described. FIG. 4 illustrates an example of the functional configuration of the analyzing device. The analyzing device 204 includes a determining unit 401, a first searching unit 402, a second searching unit 403, an output unit 404, a calculation unit 405, and an updating unit 406. The determining unit 401, the first searching unit 402, the second searching unit 403, the output unit 404, the calculation unit 405, and the updating unit 406 that serve as a controller are achieved by causing the CPU 301 to execute a program stored in a storage device. The storage device is, for example, the ROM 302 (illustrated in FIG. 3), the RAM 303 (illustrated in FIG. 3), the disk 305 (illustrated in FIG. 3), or the like.

The analyzing device 204 may access a configuration information group 410 and the operational information log 221. The configuration information group 410 includes the physical machine configuration information 211, the virtual machine configuration information 212, and a configuration change record 222.

First configuration information identifies configurations of a first physical machine before and after a virtual machine that is not the first virtual machine to be analyzed and is executed on the first physical machine on which the first virtual machine is executed is changed. In addition, the first configuration information may include information identifying the virtual machine changed and a type of the change. The information identifying the virtual machine changed and the type of the change are recorded in the configuration change record 222. The first configuration information may include types of software executed by virtual machines executed on the first physical machine before and after the change, the amounts of hardware resources assigned to the virtual machines, and the amounts of hardware resources included in the first physical machine. The types of the software executed by the virtual machines are stored in the virtual machine configuration information 212.

Second configuration information identifies configurations of a physical machine before and after a virtual machine executed on the physical machine other than the first physical machine is changed. In addition, the second configuration information may include information identifying the virtual machine changed and a type of the change. The second configuration information may include types of software executed by virtual machines executed on the physical machine before and after the change, hardware resources assigned to the virtual machines, and the amounts of hardware resources included in the physical machine.

Operational information of the first virtual machine includes utilization of hardware resources used per unit of time by the first virtual machine and included in the first physical machine. The utilization of the hardware resources is CPU utilization, memory utilization, a disk busy rate, and the like.

Operational information of the virtual machines executed on the second physical machine include utilization of hardware resources included in the second physical machine and used per unit of time by the virtual machines executed on the second physical machine.

The determining unit 401 determines whether or not a time period in which the utilization included in the operational information of the first virtual machine executed on the first physical machine after the change is measured is equal to or longer than a predetermined time period. The predetermined time period is, one day, one week, or the like, for example. The result of the determination is stored in a storage region such as the disk 305.

The first searching unit 402 references the second configuration information and searches for the second physical machine of which configurations before and after the change are similar to the configurations of the first physical machines before and after the change based on the first configuration information. In addition, if the determining unit 401 determines that the time period in which the utilization included in the operational information of the first virtual machine executed on the first physical machine after the change is measured is shorter than the predetermined time period, the first searching unit 402 may search for the second physical machine.

In addition, based on the first configuration information, the first searching unit 402 references the second configuration information and searches for a physical machine of which a type of a change matches the first physical machine and of which the configuration is similar to the first physical machine after the change and that includes a virtual machine of which the configuration is similar to the virtual machine changed in the first physical machine. The first searching unit 402 may use the result of the search to search the second physical machine of which the configurations before and after the change are similar to the first physical machine before and after the change.

In addition, based on the first configuration information, the first searching unit 402 may reference the second configuration information, search for a physical machine satisfying the following first to third requirements, and thereby search for the second physical machine of which the configurations before and after the change are similar to the configurations of the first physical machine before and after the change. The first requirement is that the interested physical machine is a physical machine that executes software of which types are the same as software executed by the virtual machines executed on the first physical machine before and after the change. The second requirement is that the interested physical machine is a physical machine that includes virtual machines to which hardware resources of which the amounts are close to the amounts of hardware resources assigned to the virtual machines executed on the first physical machine before and after the change are assigned. The third requirement is that the interested physical machine is a physical machine that has hardware resources of which the amounts are close to the amounts of the hardware resources included in the first physical machine.

In addition, based on the first configuration information, the first searching unit 402 may reference the second configuration information updated by the updating unit 406 and search for the second physical machine of which the configurations before and after the change are similar to the configurations of the first physical machine before and after the change. Information identifying the second physical machine is stored in a storage region such as the RAM 303 or the disk 305.

When the second physical machine is searched for by the first searching unit 402, the second searching unit 403 references operational information of virtual machines executed on the second physical machine before the change and searches for a similar virtual machine based on the operational information of the first virtual machine before the change.

In addition, the second searching unit 403 may search for a similar virtual machine that is among the virtual machines executed on the second physical machine before and after the change and of which operational information is similar to the first virtual machine and for which a time period in which utilization included in operational information of the virtual machine after the change is measured is equal to or longer than the predetermined time period. Information identifying the similar virtual machine is stored in a storage region such as the RAM 303 or the disk 305.

When the similar virtual machine is searched for by the second searching unit 403, the output unit 404 outputs operational information of the similar virtual machine executed on the second physical machine after the change. The output unit 404 may notify a program included in the analyzing device 204 and to be executed to execute an analysis process of the output operational information or transmit the operational information to the administrator apparatus 201.

When the similar virtual machine is searched for by the second searching unit 403, the calculation unit 405 calculates differences between the utilization included in the operational information of the first virtual machine before the change and utilization included in the operational information of the similar virtual machine before the change. Then, the calculation unit 405 calculates the utilization included in the operational information of the first virtual machine after the change based on the calculated differences and utilization included in the operational information of the similar virtual machine executed on the second physical machine after the change.

For example, the calculation unit 405 calculates differences obtained by subtracting averages of the utilization included in the operational information of the similar virtual machine before the change from averages of the utilization included in the operational information of the first virtual machine before the change. Then, the calculation unit 405 adds the calculated differences to the utilization included in the operational information of the similar virtual machine executed on the second physical machine after the change and thereby calculates the utilization included in the operational information of the first virtual machine after the change.

In addition, the calculation unit 405 calculates differences obtained by subtracting the utilization included in the operational information of the first virtual machine before the change from the averages of the utilization included in the operational information of the similar virtual machine before the change. Then, the calculation unit 405 may calculate the utilization included in the operational information of the first virtual machine after the change by subtracting the calculated differences from the utilization included in the operational information of the similar virtual machine executed on the second physical machine after the change. In addition, the calculation unit 405 may calculate the utilization included in the operational information of the first virtual machine after the change in accordance with a procedure (described later) illustrated in FIG. 16. The calculated utilization is stored in a storage region such as the RAM 303 or the disk 305.

The updating unit 406 updates the second configuration information based on a configuration of the physical machine after a change of a virtual machine executed on the physical machine.

FIG. 5 illustrates an example of stored details of the physical machine configuration information. The physical machine configuration information illustrated in FIG. 5 stores records 501-1 to 501-3.

The physical machine configuration information 211 includes five fields, a "physical machine ID" field, a "CPU operational frequency" field, a "number of CPUs" field, a "memory amount" field, and a "disk capacity" field. In the "physical machine ID" field, IDs that identify the physical machines are stored. In the "CPU operational frequency" field, operational frequencies of CPUs included in the physical machines are stored. In the "number of CPUs" field, the numbers of the CPUs included in the physical machines are stored. In the "memory amount" field, the amounts of memories included in the physical machines are stored. In the "disk capacity" field, the capacities of disks included in the physical machines are stored.

For example, the record 501-1 indicates that the physical machine with an ID of HostA has 8 CPUs with an operational frequency of 3.0 GHz, a memory of 16 GB, and a disk of 1 TB. Hereinafter, HostX represents a physical machine, and X represents a character string of a number or an alphabet.

Figure 6:
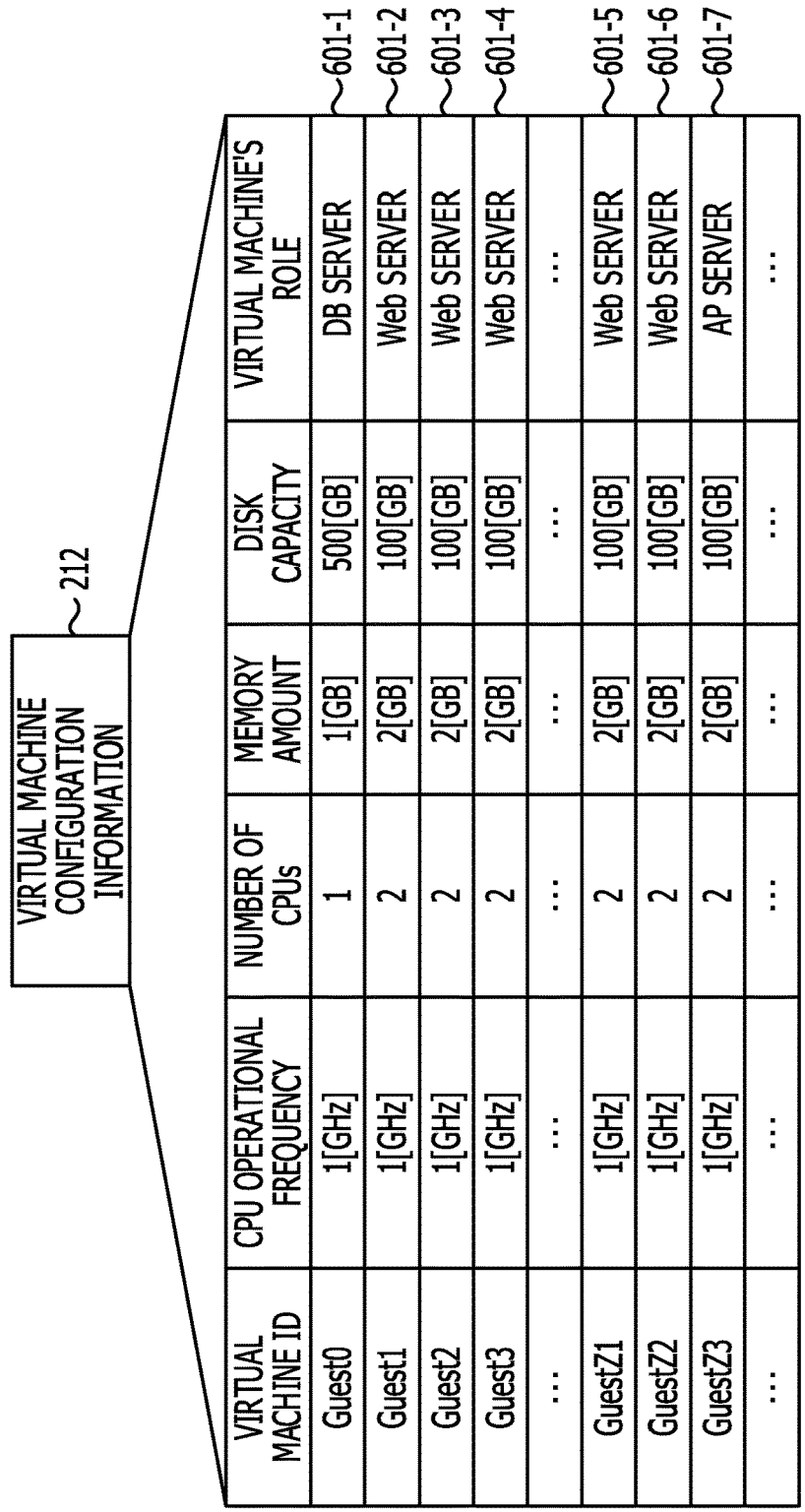
FIG. 6 illustrates an example of stored details of virtual machine configuration information.

FIG. 6 illustrates an example of stored details of the virtual machine configuration information. The virtual machine configuration information 212 illustrated in FIG. 6 stores records 601-1 to 601-7.

The virtual machine configuration information 212 includes six fields, a "virtual machine ID" field, a "CPU operational frequency" field, a "number of CPUs" field, a "memory amount" field, a "disk capacity" field, and a "virtual machine's role" field. In the "virtual machine ID" field, IDs that identify virtual machines are stored. In the "CPU operational frequency" field, operational frequencies of CPUs that are requested by the virtual machines are stored. In the "number of CPUs" field, the numbers of the CPUs that are requested by the virtual machines are stored. In the "memory amount" field, the amounts of memories that are requested by the virtual machines are stored. In the "disk capacity" field, the capacities of disks that are requested by the virtual machines are stored.

In the "virtual machine's role" field, roles determined based on types of software executed by the virtual machines are stored. In the "virtual machine's role" field, the following first to third identifiers are stored, for example. The first identifier is a "DB server" that indicates that an interested virtual machine executes database server software and is thereby used as a database server. The second identifier is a "web server" that indicates that an interested virtual machine executes web server software and is thereby used as a web server. The third identifier is an "AP server" that indicates that an interested virtual machine executes a server application and is thereby used as an application server.

For example, the record 601-1 indicates that a virtual machine that has an ID of Guest0 and is used as a DB server requests one CPU with an operational frequency of 1 GHz, a memory with an amount of 1 GB, and a disk with a capacity of 500 GB. Hereinafter, GuestX represents a virtual machine, and X represents a character string of a number or an alphabet.

FIG. 7 illustrates an example of stored details of the operational information log. The operational information log 221 illustrated in FIG. 7 stores records 701-1 to 701-4. The operational information log 221 includes six fields, a "time" field, a "machine ID" field, a "CPU utilization" field, a "memory utilization" field, a "disk busy rate" field, and a "number of transactions" field.

In the "time" field, a value that represents a time and date when operational information is recorded is stored. In the "machine ID" field, an ID that identifies a physical or virtual machine of which the operational information is recorded is stored. In the "CPU utilization" field, a measured value of utilization of a CPU used by the machine of which the operational information is recorded is stored. In the "memory utilization" field, a measured value of utilization of a memory used by the machine of which the operational information is recorded is stored.

If the machine of which the operational information is recorded is a virtual machine, the value stored in the "CPU utilization" field is a ratio of the number of CPUs used by the virtual machine to the number, stored in the physical machine configuration information 211, of CPUs of an interested physical machine. Alternatively, the value stored in the "CPU utilization" field may be a ratio of the number of CPUs used by the virtual machine to the number, stored in the virtual machine configuration information 212, of CPUs requested by the virtual machine. The same applies to the "memory utilization" field.

In the "disk busy rate" field, a rate at which an access latency occurs due to access to a disk by the machine of which the operational information is recorded is stored. In the "number of transactions" field, the number of times of access to the cloud environment 203 by the user apparatus is stored.

For example, the record 701-1 indicates that at "0:00 o'clock, Nov. 10, 2012", CPU utilization, memory utilization, and a disk busy rate of Guest1 are 40%, 30%, and 40%, respectively, and the number of transactions is 10.

FIG. 8 illustrates an example of stored details of the configuration change record. The configuration change record 222 illustrated in FIG. 8 stores records 801-1 to 801-7.

The configuration change record 222 includes eight fields, a "case ID" field, a "physical machine ID 1" field, a "virtual machine ID list 1" field, a "physical machine ID 2" field, a "virtual machine ID list 2" field, a "changed virtual machine ID" field, a "change type" field, and a "time and date" field. In the "case ID" field, an ID that identifies a case in which a virtual machine configuration of a physical machine is changed is stored. In the "physical machine ID 1" field, an ID of the physical machine of which the virtual machine configuration is changed is stored. In the "virtual machine ID list 1" field, a list of IDs of virtual machines executed on the physical machine that has the ID stored in the "physical machine ID 1" field and of which the virtual machine configuration is changed is stored. The "virtual machine ID list 1" field does not include an ID of the virtual machine changed.

In the "physical machine ID 2" field, an ID of a physical machine to which a virtual machine is changed so as to be migrated is stored. In the "physical machine ID 2" field, the information is stored when the type of the change is "migration". In the "virtual machine ID list 2" field, a list of an ID of a virtual machine executed on the physical machine that has the ID stored in the "physical machine ID 2" field and to which the virtual machine is changed so as to be migrated is stored. The "virtual machine ID list 2" field does not include the ID of the virtual machine changed.

In the "changed virtual machine ID" field, the ID of the virtual machine changed is stored. In the "change type" field, a type of the change is stored. The types of changes are "deletion" indicating that a virtual machine is deleted, "addition" indicating that a virtual machine is added, and "migration" indicating that a virtual machine is migrated from a certain physical machine to another physical machine. In the "time and date" field, a time and date when the virtual machine configuration is changed is stored.

For example, the record 801-1 indicates that from a state in which Guest0, Guest1, and Guest2 are executed on HostA, Guest0 is deleted from HostA at 20:00, Sep. 10, 2012. In addition, the record 801-2 indicates that from a state in which Guest1 and Guest2 are executed on HostA, Guest3 is added to HostA at 15:00, Oct. 10, 2012. The record 801-5 indicates that from a state in which Guest7 and Guest9 are executed on HostC, Guest9 is migrated to HostD executing Guest8 at 23:00, Oct. 15, 2012.

Virtual machines are frequently changed in the cloud environment 203. Thus, if all the changes of the virtual machines are stored, the amount of information to be stored in the configuration change record 222 is large. The configuration change record 222 may store a limited number of records such as the latest 10 records for changes of configurations of physical machines. This is due to the fact that storing new changes of physical machines minimizes an impact of changes in the overall cloud environment 203 on performance information of virtual machines. The changes in the overall cloud environment 203 include an addition of a physical machine, deletion of a physical machine, a change of a network or the like within the cloud environment 203, and an execution rate, changed at a turning point of an economic activity or due to a predicted change of users, of a virtual machine.

If a virtual machine to be analyzed is GuestZ1, the first configuration information includes the record 801-7, the record 501-3, and the records 601-5 to 601-7. If the second physical machine is HostA, the second configuration information includes the record 801-2, the record 501-1, and the records 601-2 to 601-4.

Next, a procedure for searching for a similar virtual machine from the stored details described with reference to FIGS. 5 to 8 is described with reference to FIGS. 9 to 15. FIGS. 9 to 15 assume that a virtual machine to be analyzed is GuestZ1.

Figure 9:
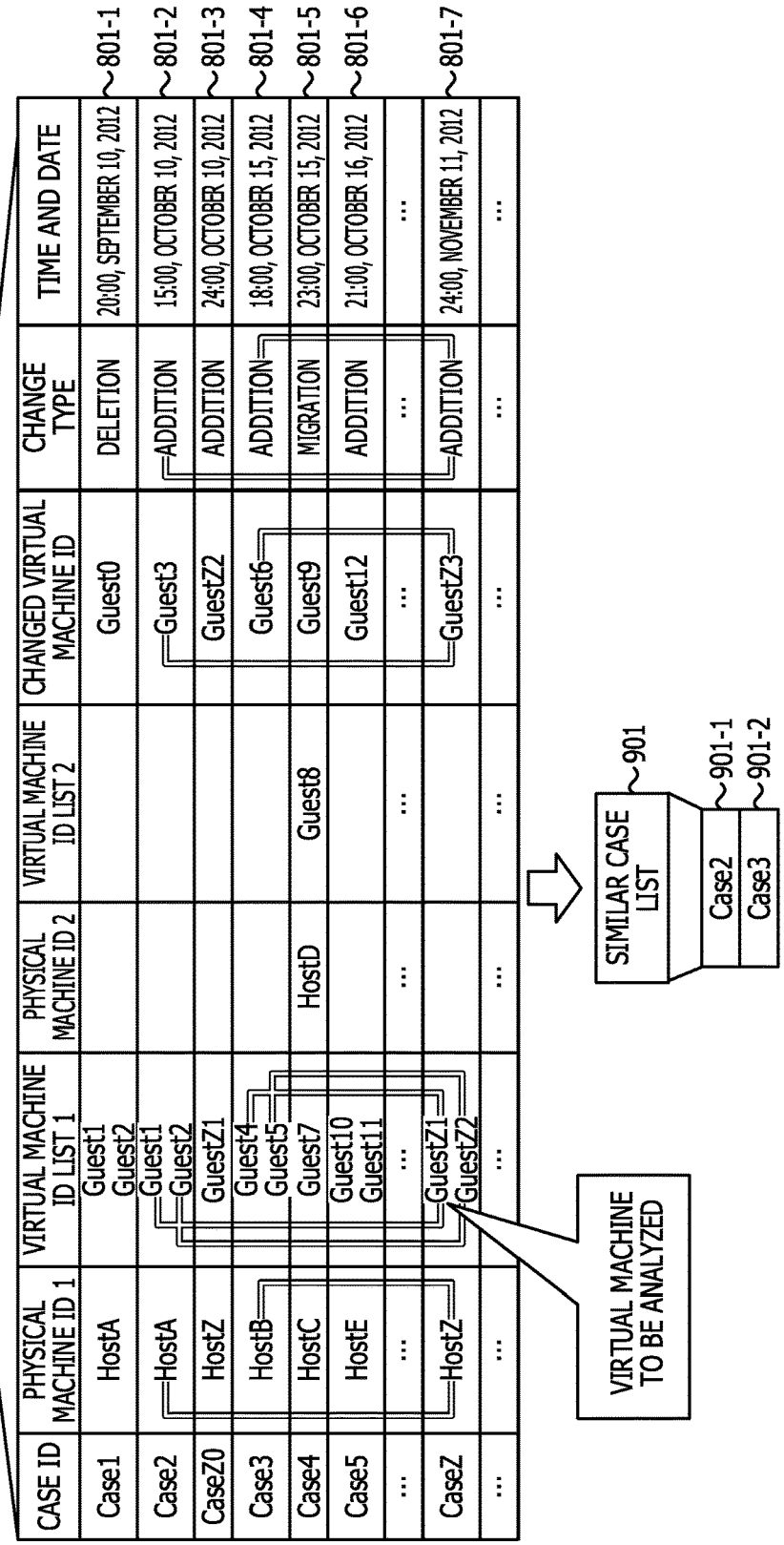
FIG. 9 illustrates an example of generation of a similar case list.

FIG. 9 illustrates an example of generation of a similar case list. The analyzing device 204 references the configuration change record 222 and searches for a case of which information 1 to 6 (described below) matches information 1 to 6 of a case corresponding to the virtual machine to be analyzed.

The information 1 is configuration information of a physical machine with an ID is stored in the "physical machine ID 1" field.

The information 2 is configuration information of each virtual machine with an ID is stored in the "virtual machine ID list 1" field.

The information 3 is configuration information of a physical machine with an ID stored in the "physical machine ID 2" field.

The information 4 is configuration information of each virtual machine with an ID stored in the "virtual machine ID list 2" field.

The information 5 is configuration information of a virtual machine with an ID stored in the "changed virtual machine ID" field.

The information 6 is a change type that is stored in the "change type" field.

Regarding the information 1, the configurations of the physical machines within the cloud environment 203 become easily similar to each other and are mainly classified into three types, a high-performance configuration, a middle-performance configuration, and a low-performance configuration in general. In the cloud environment 203, physical machines of which configurations match each other are highly likely to exist. Regarding the information 1 to 5, the analyzing device 204 may determine that physical machines of which configurations do not completely match each other and of which the amounts of hardware resources are equal to each other or different by a certain value or smaller from each other match each other, for example.

For example, the analyzing device 204 references the record 801-7 corresponding to a case to be compared and identifies that GuestZ1 is included in HostZ. Then, the analyzing device 204 searches for a record that is included in the configuration change record 222 and includes information that has been stored in the six fields and matches information stored in the record 801-7 in the six fields.

In the example illustrated in FIG. 9, the analyzing device 204 determines that the information 1 to 6 of CaseZ corresponding to the record 801-7 matches the information 1 to 6 of Case2 corresponding to the record 801-2 and the information 1 to 6 of Case3 corresponding to the record 801-3. An example in which the analyzing device 204 determines that the information 1 to 6 of CaseZ corresponding to the record 801-7 matches the information 1 to 6 of Case2 corresponding to the record 801-2 is described below.

For the information 1, the analyzing device 204 references the physical configuration information and determines that configuration information of HostA with the ID stored in the "physical machine ID 1" field is the same as configuration information of HostZ. Similarly, for the information 2, the analyzing device 204 references the virtual configuration information and determines that configuration information of Guest1 is the same as configuration information of GuestZ1 and that configuration information of Guest2 is the same as configuration information of GuestZ2. For the information 3 and 4, since there is no value in the "physical machine ID 2" field and the "virtual machine ID list 2" field in the records 801-2 and 801-7, the analyzing device 204 determines that configuration information is the same. For the information 5, the analyzing device 204 references the virtual machine configuration information and determines that configuration information of Guest3 is the same as configuration information of GuestZ3. For the information 6, since the type of a change in the record 801-2 is "addition" and the type of a change in the record 801-7 is "addition", the analyzing device 204 determines that the types are the same.

Since the information 1-6 of the record 801-2 matches the information 1-6 of the record 801-7, the analyzing device 204 searches for the case that matches the case to be compared, and the analyzing device 204 registers the case ID of the searched matched case in a similar case list 901. In the example illustrated in FIG. 9, the analyzing device 204 stores "Case2" in a record 901-1 and stores "Case3" in a record 901-2.

Hereinafter, a physical machine identified by an ID stored in the "physical machine ID 1" field or the "physical machine ID 2" field and corresponding to a case to be compared is referred to as a "physical machine to be compared" in some cases. In addition, a virtual machine identified by an ID stored in the "virtual machine ID list 1" field or the "virtual machine ID list 2" field and corresponding to the case to be compared is referred to as a "virtual machine to be compared" in some cases. Furthermore, a case of which the information 1 to 6 matches the information 1 to 6 of the case to be compared is referred to as a "candidate case to be compared" in some cases. A physical machine identified by an ID stored in the "physical machine ID 1" field or the "physical machine ID 2" field and corresponding to the candidate case to be compared is referred to as a "candidate physical machine to be compared" in some cases. A virtual machine identified by an ID stored in the "virtual machine ID list 1" field or the "virtual machine ID list 2" field and corresponding to the candidate case to be compared is referred to as a "candidate virtual machine to be compared" in some cases".

FIGS. 10A, 10B, and 10C illustrate an example of generation of a similarity list from the similar case list. The analyzing device 204 references the similar case list 901, the physical machine configuration information 211, and the virtual machine configuration information 212 and generates a similarity list 1001.

The similarity list 1001 illustrated in FIG. 10C includes six fields, a "candidate number" field, a "case ID" field, a "physical machine ID 1" field, a "virtual machine ID 1" field, a "virtual machine ID 2" field, and a "similarity" field. The number of fields for virtual machine IDs depends on the number of virtual machines with IDs stored in the "virtual machine ID list 1" field for a case ID of a case to be compared. In the example illustrated in FIG. 10C, since the case ID of the case to be compared is "CaseZ" and the number of virtual machines with IDs stored in the "virtual machine ID list 1" for "CaseZ" is 2, the similarity list 1001 has the "virtual machine ID 1" field and the "virtual machine ID 2" field. The number of fields for physical machine IDs and the number of fields for virtual machine IDs depend on the type of a change corresponding to the case ID of the case to be compared.

If the type of the change corresponding to the case ID of the case to be compared is "addition" or "deletion", the number of fields for physical machine IDs is 1 and the number of fields for virtual machine IDs is equal to the number of virtual machines with IDs stored in the "virtual machine ID list 1" field. On the other hand, if the type of the change corresponding to the case ID of the case to be compared is "migration", the number of fields for physical machine IDs is 2 and the number of fields for virtual machine IDs is equal to the total of the number of virtual machines with IDs stored in the "virtual machine ID list 1"

field and the number of virtual machines with IDs stored in the "virtual machine ID list 2" field.

In the "candidate number" field, IDs that identify records of the similarity list 1001 are stored. In the "case ID" field, a case ID of a case to be compared is stored in a top record, and case IDs of candidate cases to be compared are stored in second and later records. In the "physical machine ID 1" field, IDs of physical machines corresponding to the case IDs are stored. In the "virtual machine ID 1" field, first virtual machine IDs of the virtual machine ID list that correspond to the case IDs are stored. In the virtual machine ID 2" field, second virtual machine IDs of the virtual machine ID list that correspond to the case ID are stored. In the "similarity" field, a standard similarity is stored in the top record, and similarities are stored in the second and later records. The similarities are described later with reference to FIG. 11. The standard similarity is described later with reference to FIG. 14.

First, the analyzing device 204 stores "CaseZ" as a candidate number 0 in a record 1001-1. As details of the record 1001-1, the analyzing device 204 stores "HostZ" in the physical machine ID 1" field, "GuestZ1" in the "virtual machine ID 1" field, and "GuestZ2" in the "virtual machine ID 2" field.

Next, the analyzing device 204 associates virtual machines of which roles are the same with each other in order from a candidate number 1. Roles of GuestZ1 and GuestZ2 stored in the "virtual machine ID 1" and "virtual machine ID 2" fields of "CaseZ" are web servers according to the virtual machine configuration information 212. In addition, roles of Guest1 and Guest2 stored in the "virtual machine ID 1" and "virtual machine ID 2" fields of "Case2" are web servers according to the virtual machine configuration information 212.

Thus, the following first and second associations are executed. For the first associations, as illustrated in FIG. 10A, the analyzing device 204 associates GuestZ1 and Guest1 with each other and associates GuestZ2 and Guest2 with each other. For the second associations, as illustrated in FIG. 10B, the analyzing device 204 associates GuestZ1 and Guest2 with each other and associates GuestZ2 and Guest1 with each other. The analyzing device 204 registers the first associations as the candidate number 1 indicated in the record 1001-2 in the similarity list 1001 and registers the second associations as a candidate number 2 indicated in the record 1001-3 in the similarity list 1001.

Similarly, the analyzing device 204 associates GuestZ1 and Guest4 with each other for Case3, associates GuestZ2 and Guest5 with each other for Case3, and registers the associations as a candidate number 3 indicated in the record 1001-4 in the similarity list 1001. In addition, the analyzing device 204 associates GuestZ1 and Guest5 with each other for Case3, associates GuestZ2 and Guest4 with each other for Case3, and registers the associations as a candidate number 4 indicated in the record 1001-4 in the similarity list 1001.

Figure 11:
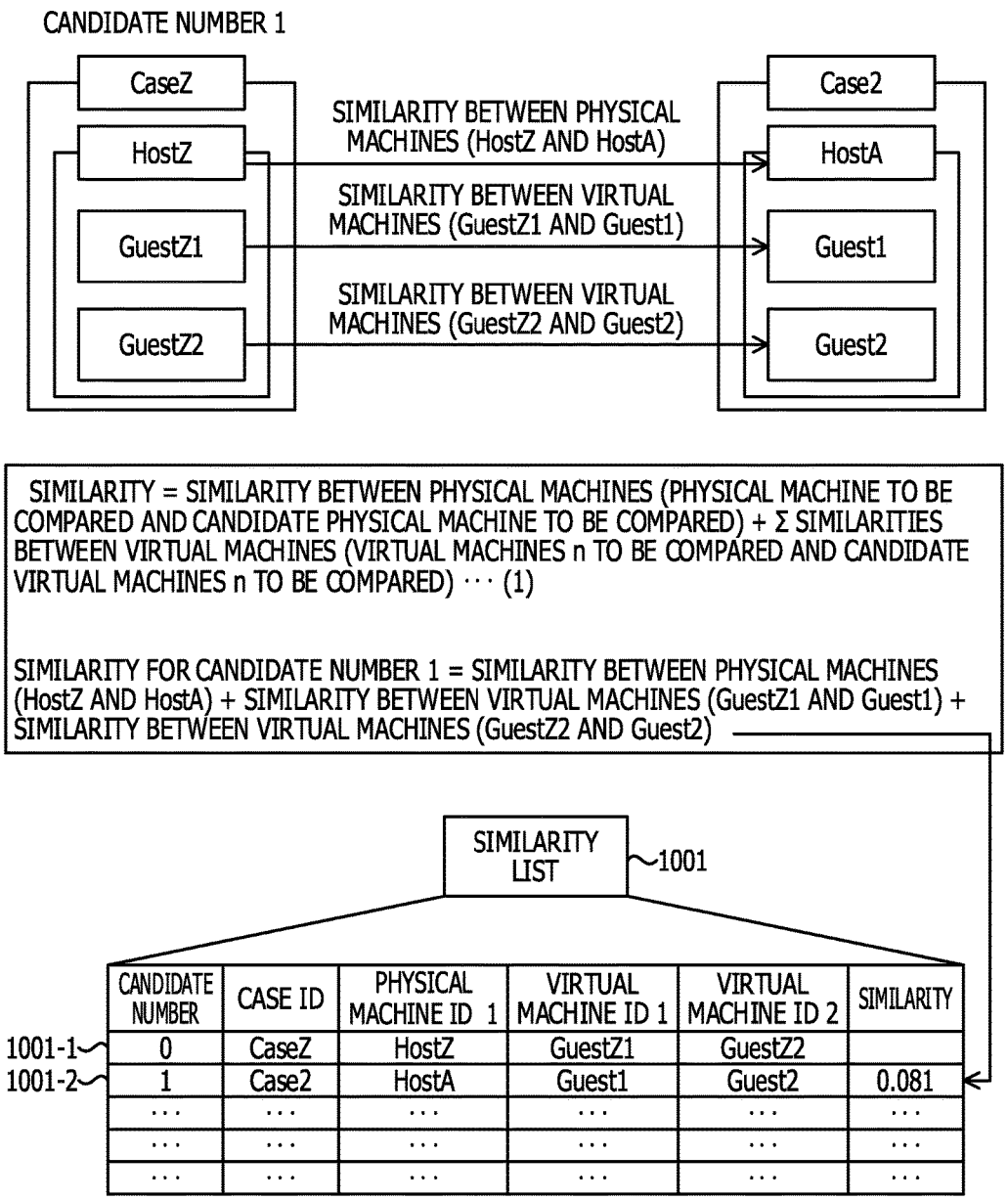
FIG. 11 illustrates an example of calculation of a similarity.

FIG. 11 illustrates an example of calculation of a similarity. The analyzing device 204 calculates similarities for the records 1001-2 to 1001-5 of the similarity list 1001. The analyzing device 204 uses the following Equation (1) to calculate the similarities.

A similarity=a similarity between physical machines (physical machine to be compared and candidate physical machine to be compared)+Σ(similarities between virtual machines)(virtual machines $n$ to be compared and candidate virtual machines $n$ to be compared) (1)

A similarity between physical machines is described later with reference to FIG. 12. A similarity between virtual machines is described later with reference to FIG. 13. In Equation (1), n represents an integer number in a range from 1 to the number of fields for virtual machine IDs in the similarity list 1001. For example, for the record 1001-2, the analyzing device 204 uses Equation (1) to calculate a similarity for the candidate number 1 as follows.

The similarity for the candidate number 1=a similarity between the physical machines (HostZ and HostA)+a similarity between the virtual machines (GuestZ1 and Guest1)+a similarity between the virtual machines (GuestZ2 and Guest2)

The analyzing device 204 stores the similarity calculated for the candidate number 1 in the "similarity" field of the record 1001-2.

FIG. 12 illustrates an example of calculation of a similarity between physical machines. The analyzing device 204 uses the following Equation (2) to calculate a similarity between physical machines.

A similarity between physical machines (physical machine to be compared and candidate physical machine to be compared)=a similarity between operational trends of CPU utilization+a similarity between operational trends of memory utilization+a similarity between operational trends of disk busy rates (2)

A similarity between operational trends is a similarity between the amount of a resource that is used per unit of time by the physical machine to be compared and is included in the physical machine to be compared and the amount of a resource that is used per unit of time by the candidate physical machine to be compared and is included in the candidate physical machine to be compared. The larger a value of the similarity between the operational trends, the more the physical machines are similar to each other. The unit of time may be one hour or one day, for example. Alternatively, a usage rate of the resource used by the physical machine to be compared for one hour of each day of one week from Sunday to Saturday and a usage rate of the resource used by the candidate physical machine to be compared for one hour of each day of the week from Sunday to Saturday may be compared with each other to calculate the similarity between the operational trends. The reason for comparing the usage rates of the resources used for one hour of each day of one week from Sunday to Saturday is that operations executed on weekdays of a week are different from operations executed on holidays of the week in general. For example, a database server executes a process for access from a user apparatus on weekdays and executes a weekly process by a stored procedure on holidays.

The embodiment assumes that a time period T in which analysis is able to be executed with sufficient accuracy is one week. In addition, the embodiment assumes that if configurations of virtual machines are continuously maintained for one week or more, the analyzing device 204 calculates similarities between operational trends by comparing the amounts of resources used by the physical machine to be compared for one hour of each day of one week from Sunday to Saturday with the amount of resources used by the candidate physical machine to be compared for one hour of each day of the week from Sunday to Saturday. If the configurations of the virtual machines are maintained only for a time period of less than one week, the analyzing device 204 does not calculate the similarities between the operational trends and remove the candidate physical machine to be compared from candidate physical machines to be compared.

Hereinafter, a specific example of calculation of a similarity between operational trends of CPU utilization is described. The calculation of a similarity between operational trends of memory utilization and the calculation of a similarity between operational trends of disk busy rates are the same as or similar to the calculation of a similarity between operational trends of CPU utilization, and a description thereof is omitted.

If the configurations of the virtual machines are continuously maintained for one week or more, the analyzing device 204 compares a CPU used by the physical machine to be compared for each hour of the week from Sunday to Saturday with a CPU used by the candidate physical machine to be compared for each hour of the week, as represented by a graph 1200 illustrated in FIG. 12. The graph 1200 represents a relationship between CPU utilization of the physical machine to be compared and time and a relationship between CPU utilization of the candidate physical machine to be compared and time.

The example illustrated in FIG. 12 assumes that the physical machine to be compared is a server A and the candidate physical machine to be compared is a server B. The analyzing device 204 extracts CPU utilization of the server A per unit of time and CPU utilization of the server B per unit of time. In this case, the unit of time is one hour. The results of the extraction are represented by a table 1201. The table 1201 has records 1201-1 to 1201-6. For example, the record 1201-1 indicates that the CPU utilization of the server A at 01:00 is 10% and the CPU utilization of the server B at 01:00 is 20%.

Then, the analyzing device 204 generates the amounts of changes in the CPU utilization per hour from the CPU utilization per hour. The results of the generation are represented by a table 1202. The table 1202 has records 1202-1 to 1202-5. For example, the record 1201-1 indicates that the amount of a change in the CPU utilization of the server A in a time zone from 01:00 to 02:00 is 10% and the amount of a change in the CPU utilization of the server B in the time zone from 01:00 to 02:00 is 20%.

Subsequently, the analyzing device 204 uses the following Equation (3) to calculate a similarity between the operational trends.

The similarity between the operational trends=$1/\sqrt{\Sigma}$
((the amount of a change of the physical
machine to be compared in each time zone)−
(the amount of a change of the candidate physical machine to be compared in each time zone)
^2)     (3)

A denominator of Equation (3) represents a distance between a point representing the amount of a change of the physical machine to be compared in each of time zones and a point representing the amount of a change of the candidate physical machine to be compared in each of the time zones in the graph representing the amounts of changes in the time zones. In the example illustrated in FIG. 12, the analyzing device 204 uses Equation (3) to calculate the similarity between the operational trends of the CPU utilization as follows.

Figure 13:
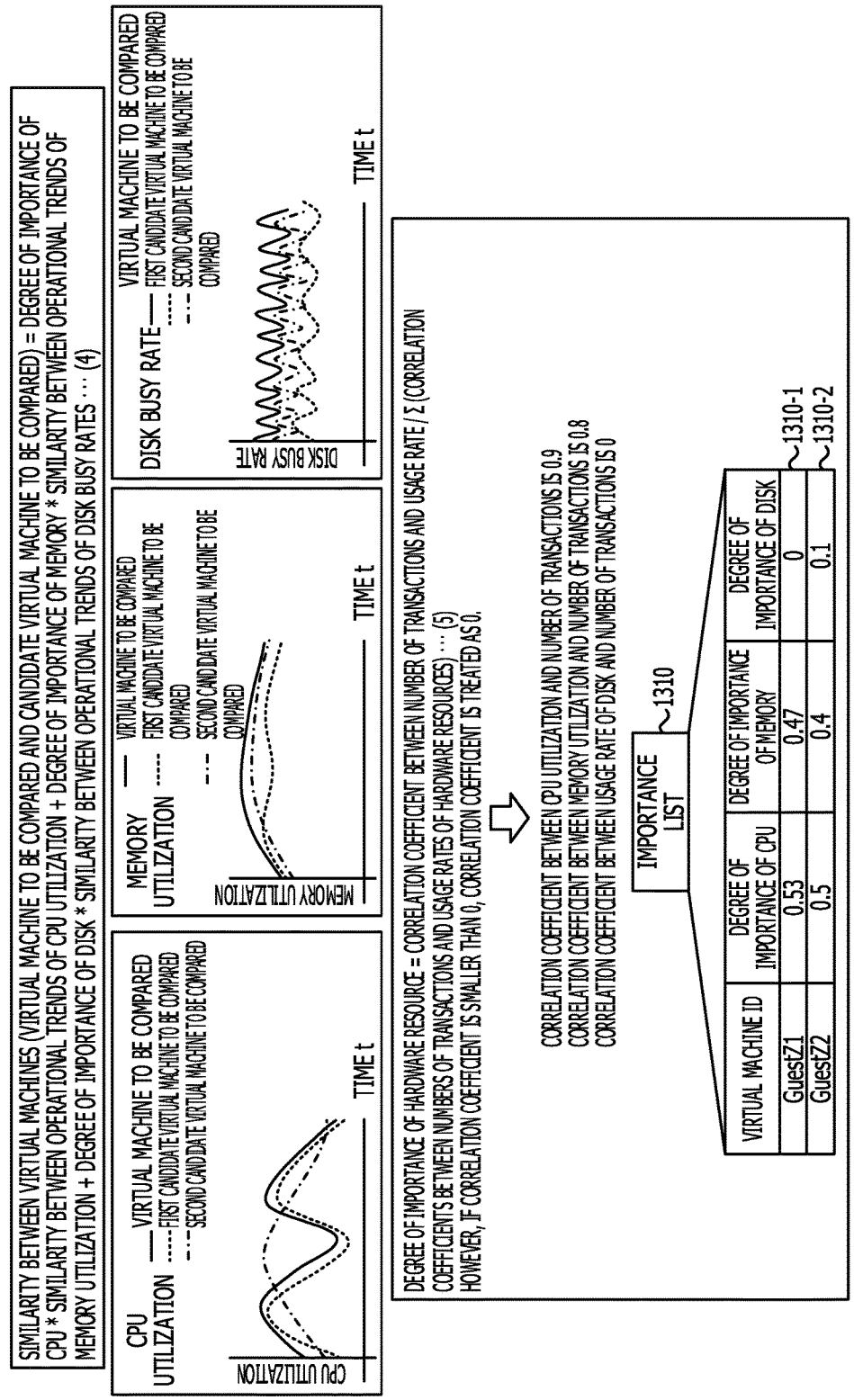
FIG. 13 illustrates an example of calculation of a similarity between virtual machines.

The similarity between the operational trends of the
CPU utilization=$1/\sqrt{\Sigma}((10-20)^2+(20-20)^2+(40-20)^2+(-30-20)^2+(-30-0)^2+(-20-(-20))^2)=0.16$ FIG. 13 illustrates an example of calculation of a similarity between virtual machines. The analyzing device 204 uses the following Equation (4) to calculate a similarity between virtual machines.

The similarity between the virtual machines(virtual
machine to be compared and candidate virtual
machine to be compared)=A degree of importance of a CPU*a similarity between operational trends of CPU utilization+a degree of
importance of a memory*a similarity between
operational trends of memory utilization+a
degree of importance of a disk*a similarity
between operational trends of disk busy rates     (4)

Procedures for calculating the similarity between the operational trends of the CPU utilization, the similarity between the operational trends of the memory utilization, and the similarity between the operational trends of the disk busy rates are the same as the procedure (described above with reference to FIG. 12) for calculating a similarity between operational trends of physical machines, and a description thereof is omitted.

The degree of importance of the CPU, the degree of importance of the memory, and the degree of importance of the disk are degrees indicate how much the CPU, the memory, and the disk affect an operation. Hereinafter, the degree of importance of the CPU, the degree of importance of the memory, and the degree of importance of the disk are merely referred to as "degrees of importance". Operational trends that depend on an operation may be evaluated by using the degrees of importance.

A graph 1301 represents relationships between time and CPU utilization of a virtual machine to be compared, a first candidate virtual machine to be compared, and a second candidate virtual machine to be compared. A graph 1302 represents relationships between time and memory utilization of the virtual machine to be compared, the first candidate virtual machine to be compared, and the second candidate virtual machine to be compared. A graph 1303 represents relationships between time and disk busy rates of the virtual machine to be compared, the first candidate virtual machine to be compared, and the second candidate virtual machine to be compared.

Abscissas of the graphs 1301, 1302, and 1303 represent time. An ordinate of the graph 1301 represents CPU utilization. An ordinate of the graph 1302 represents memory utilization. An ordinate of the graph 1303 represents a disk busy rate. In the graphs 1301, 1302, and 1303, solid lines represent the virtual machine to be compared, dotted lines represent the first candidate virtual machine to be compared, and alternate long and short dashed lines represent the second candidate virtual machine to be compared.

The graph 1301 indicates that a trend of the CPU utilization of the virtual machine to be compared per unit of time is similar to a change in the CPU utilization of the first candidate virtual machine to be compared per unit of time and is not similar to a change in the CPU utilization of the second candidate virtual machine to be compared per unit of time. Trends of the memory utilization and trends of the disk busy rates do not change depending on operations. Thus, the graph 1302 indicates that trends of the memory utilization of the virtual machines are similar to each other, and the graph 1303 indicates that trends of the disk busy rates of the virtual machines are similar to each other.

Operational information that most depends on operations among the CPU utilization, the memory utilization, and the disk busy rates is the CPU utilization according to the graphs 1301 to 1303. The analyzing device 204 uses the following Equation (5) to calculate a degree of importance of each of the hardware resources.

$$\text{A degree of importance of a hardware resource} = \text{a correlation coefficient between the number of transactions and a usage rate of the hardware resource} / \Sigma(\text{correlation coefficients between the numbers of transactions and usage rates of resources}) \quad (5)$$

If a correlation coefficient is calculated to be a value of less than 0, the correlation coefficient is treated as 0. For example, in the example illustrated in FIG. 13, the analyzing device 204 calculates correlation coefficients as follows, for example.

A correlation coefficient between CPU utilization and the number of transaction is 0.9.

A correlation coefficient between memory utilization and the number of transactions is 0.8.

A correlation coefficient between a usage rate of a disk and the number of transactions is 0.

Then, the analyzing device 204 uses Equation (5) to calculate degrees of importance of the hardware resources.

The degree of importance of a CPU=0.9/(0.9+0.8+0)= 0.53.

The degree of importance of a memory=0.8/(0.9+0.8+0)= 0.47.

The degree of importance of a disk=0/(0.9+0.8+0)=0.

The analyzing device 204 stores the degrees of importance of the virtual machines in an importance list 1310. The importance list 1310 illustrated in FIG. 13 stores records 1310-1 and 1301-2. For example, the record 1301-1 indicates that a degree of importance of a CPU used by GuestZ1 is 0.53, a degree of importance of a memory used by GuestZ1 is 0.47, and a degree of importance of a disk used by GuestZ1 is 0.

FIG. 14 illustrates an example of calculation of a standard similarity. The standard similarity is a value to be used to inhibit a virtual machine with a low similarity from being selected if the number of candidate virtual machines to be compared for determination of similarities is small. The analyzing device 204 selects a virtual machine with a similarity larger than the standard similarity. The analyzing device 204 uses the following Equation (6) to calculate the standard similarity.

$$\text{The standard similarity} = \text{a standard similarity for the physical machine (physical machine to be compared)} + \Sigma(\text{standard similarities for virtual machines(virtual machines } n \text{ to be compared)}) \quad (6)$$

In Equation (6), n is an integer number in a range from 1 to the number of fields for virtual machine IDs in the similarity list 1001. The analyzing device 204 uses the following Equation (7) to calculate the standard similarity for the physical machine (physical machine to be compared).

$$\text{The standard similarity for the physical machine (physical machine to be compared)} = \text{a standard similarity for an operational trend of CPU utilization} + \text{a standard similarity for an operational trend of memory utilization} + \text{a standard similarity for an operational trend of a disk busy rate} \quad (7)$$

In addition, the analyzing device 204 uses the following Equation (8) to calculate a standard similarity for the virtual machine (virtual machine to be compared).

$$\text{The standard similarity for the virtual machine (virtual machine to be compared)} = \text{a degree of importance of a CPU} * \text{a standard similarity for an operational trend of CPU utilization} + \text{a degree of importance of a memory} * \text{a standard similarity for an operational trend of memory utilization} + \text{a degree of importance of a disk} * \text{a standard similarity for an operational trend of a disk busy rate} \quad (8)$$

Procedures for calculating the degree of importance of the CPU, the degree of importance of the memory, and the degree of importance of the disk are the same as the procedure (described above with reference to FIG. 13) for calculating a degree of importance, and a description thereof is omitted.

The analyzing device 204 calculates the amount of a change in each time zone for each of weeks from the operational information log 221. FIG. 14 illustrates an example in which a standard similarity for an operational trend of CPU utilization is calculated. A table 1401 illustrated in FIG. 14 represents the amount of a change in CPU utilization in each time zone for each of weeks. The table 1401 includes records 1401-1 to 1401-3. The analyzing device 204 calculates an average of the amounts of changes in each time zone and a standard change amount of the amounts of the changes in each time zone. In this case, a standard change amount in each time zone is a value obtained by adding a standard deviation to an average in each time zone.

For example, regarding the record 1401-1, the analyzing device 204 calculates an average of 6% from a change amount of 5% in a time zone from 00:00 to 01:00 of Sunday of a first week, a change amount of 10% in the time zone from 00:00 to 01:00 of Sunday of a second week, . . . . Similarly, the analyzing device calculates a standard deviation from the change amount of 5% in the time zone from 00:00 to 01:00 of Sunday of the first week, the change amount of 10% in the time zone from 00:00 to 01:00 of Sunday of the second week, . . . , and calculates a standard change amount of 7.5% by adding the standard deviation to the average.

Subsequently, the analyzing device 204 uses the following Equation (9) to calculate the standard similarity for the operational trend.

$$\text{The standard similarity for the operational trend} = 1/\Sigma(\text{an average in each time zone} - \text{a standard change amount in each time zone})^2 \quad (9)$$

For example, in the example illustrated in FIG. 14, the analyzing device 204 uses Equation (9) to calculate the standard similarity for the operational trend of the CPU utilization as follows.

$$\text{The standard similarity for the operational trend of the CPU utilization} = 1/\Sigma((6-7.5)^2 + (13-16.3)^2 + \ldots + (23-28.6)^2 + \ldots)$$

Figure 15:
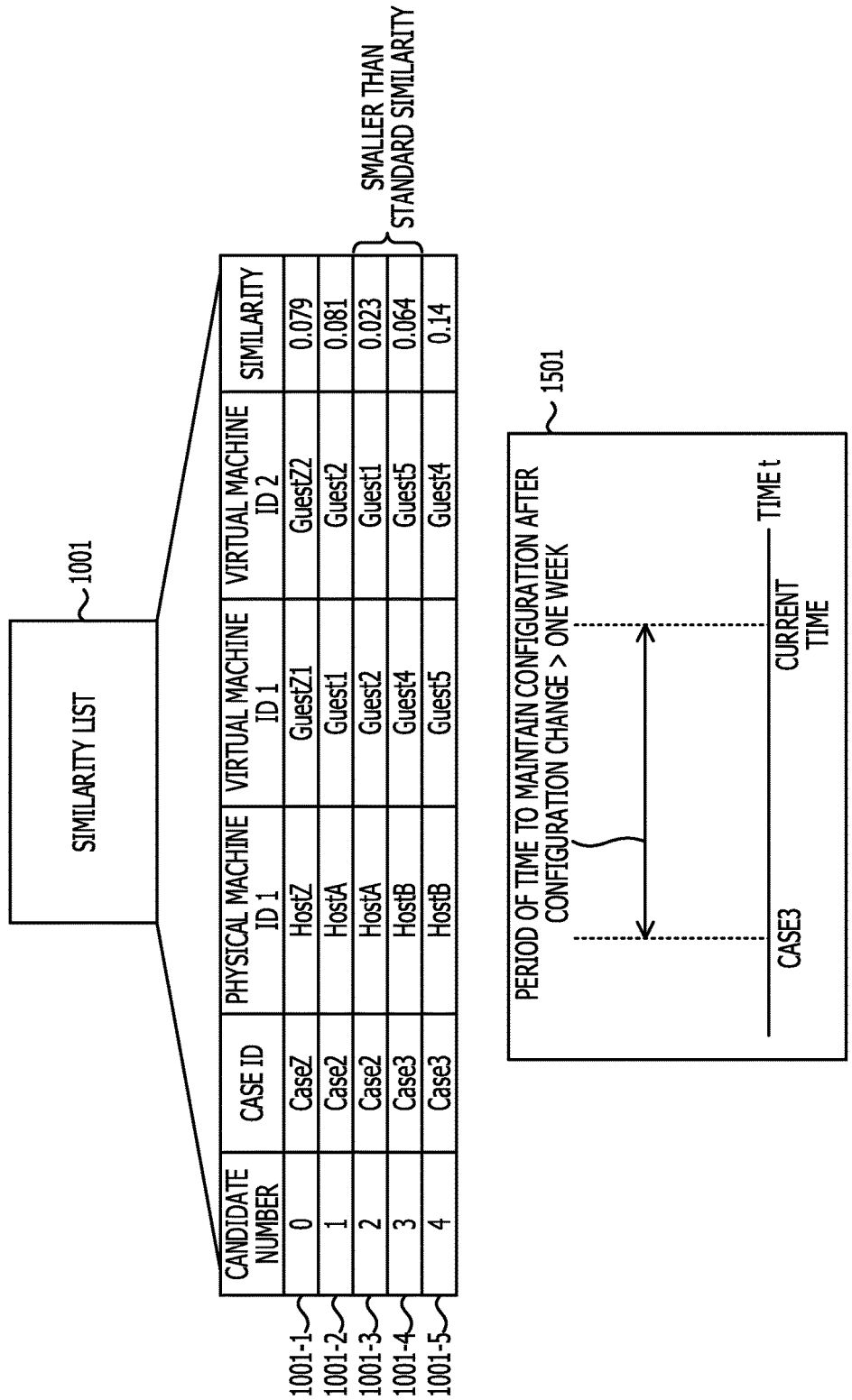
FIG. 15 illustrates an example of selection of a similar virtual machine.

FIG. 15 illustrates an example of selection of a similar virtual machine. The analyzing device 204 selects, as a similar virtual machine, a candidate virtual machine with the highest similarity among candidate virtual machines satisfying the following requirements 1 and 2.

The requirement 1 is that a standard similarity <a similarity for a virtual machine.

The requirement 2 is that the time period T in which the analysis is able to be executed with sufficient accuracy≤a period of time to maintain a configuration after a configuration change.

The period of time to maintain the configuration is a time period to a time when a virtual machine for which a similarity is calculated is changed again. If a configuration is changed, operational trends change. Thus, if the configuration is changed again, operational information after the configuration is changed again is not used.

The analyzing device 204 uses the following procedure to calculate the period of time to maintain the configuration after the configuration change. First, the analyzing device 204 acquires a case ID corresponding to the virtual machine for which the similarity has been calculated. Next, if the type of a change that corresponds to the acquired case ID is "addition" or "deletion", the analyzing device 204 identifies a physical machine with an ID stored in the "physical machine ID 1" field. If the type of the change that corresponds to the acquired case ID is "migration", the analyzing device 204 identifies a physical machine with an ID stored in the "physical machine ID 2" field. Subsequently, the analyzing device 204 searches for, from the configuration change record 222, a case that indicates that the configuration of the identified physical machine is next changed. If the case that indicates that the configuration of the identified physical machine is next changed is detected, the analyzing device 204 treats, as the period of time to maintain the configuration, a difference between a time and date corresponding to the detected case and a time and date corresponding to the case for which the similarity has been calculated. On the other hand, if the case that indicates that the configuration of the identified physical machine is next changed is not detected, the analyzing device 204 treats, as the period of time to maintain the configuration, a difference between a current time and the time and date corresponding to the case for which the similarity has been calculated.

If candidate virtual machines with the same similarity exist, the analyzing device 204 may select a candidate virtual machine maintained for the longest time period after the configuration change. If a candidate virtual machine that satisfies the requirements 1 and 2 does not exist, the analyzing device 204 does not select a similar virtual machine and terminates the procedure.

In the example illustrated in FIG. 15, similarities indicated in the records 1001-3 and 1001-4 are smaller than a standard similarity of 0.079, and the analyzing device 204 removes Guest2 and Guest4 from candidate virtual machines in accordance with the requirement 1. Then, the analyzing device 204 calculates, in accordance with the requirement 2, a period of time to maintain a configuration after a configuration change for Guest5 that is a candidate virtual machine with the highest similarity. As represented by a graph 1501 illustrated in FIG. 15, a period of time to maintain a configuration after a configuration change in Case3 is one week or more. Thus, the analyzing device 204 selects Guest5 as a similar virtual machine.

Next, effects that are obtained by using estimated values calculated using operational information of the similar virtual machine according to the embodiment are described. Specifically, a case where analysis is executed using the estimated values of the similar virtual machine according to the embodiment is described below with reference to FIG. 16.

Figure 16:
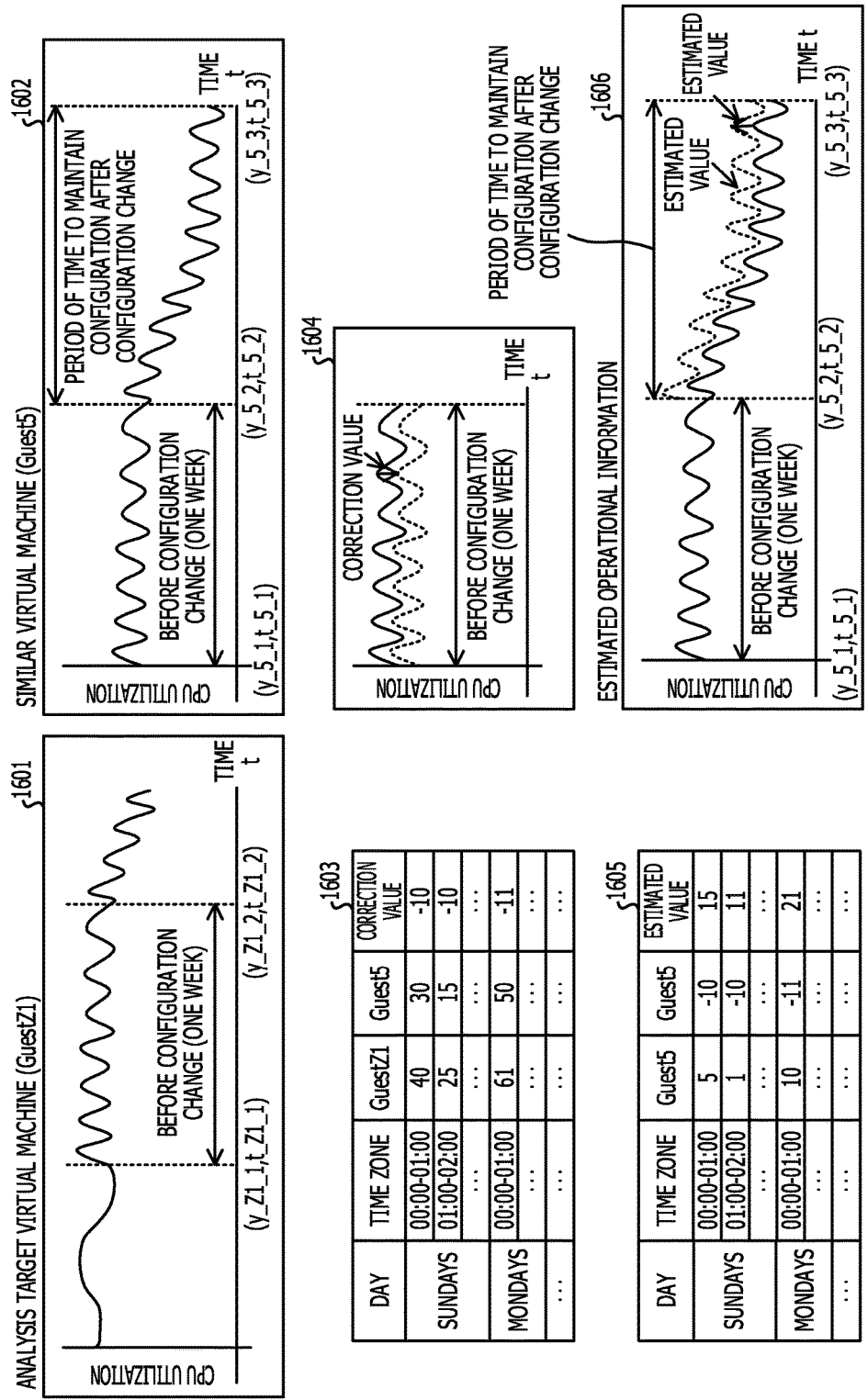
FIG. 16 illustrates an example of calculation of estimated values.

FIG. 16 illustrates an example of the calculation of the estimated values. A graph 1601 represents a relationship between time and CPU utilization of GuestZ1 that is an analysis target virtual machine. In the graph 1601, a time period from a time indicated by $(y\_Z1\_1, t\_Z1\_1)$ to a time indicated by $(y\_Z1\_2, t\_Z1\_2)$ is a period of time to maintain a configuration before a configuration change. The graph 1601 indicates that the configuration is changed by adding GuestZ3 at the time indicated by $(y\_Z1\_2, t\_Z1\_2)$, CPU resources compete with each other after the time indicated by $(y\_Z1\_2, t\_Z1\_2)$, and CPU utilization of GuestZ1 is reduced after the time indicated by $(y\_Z1\_2, t\_Z1\_2)$.

A graph 1602 represents a relationship between time and CPU utilization of Guest5 that is the similar virtual machine. A time period from a time indicated by $(y\_5\_1, t\_5\_1)$ to a time indicated by $(y\_5\_2, t\_5\_2)$ is a period of time to maintain a configuration before a configuration change. In addition, a time period from the time indicated by $(y\_5\_2, t\_5\_2)$ to a time indicated by $(y\_5\_3, t\_5\_3)$ is a period of time to maintain the configuration after the configuration change. The graph 1602 indicates that the configuration is changed by adding Guest6 at the time indicated by $(y\_5\_2, t\_5\_2)$, CPU resources compete with each other after the time indicated by $(y\_5\_2, t\_5\_2)$, and the CPU utilization of Guest5 is reduced after the time indicated by $(y\_5\_2, t\_5\_2)$.

The analyzing device 204 calculates a correction value $(y, t)$ according to the following Equation (10) using operational information of the analysis target virtual machine executed for the period of time to maintain the configuration before the configuration change and operational information of the searched similar virtual machine executed for the period of time to maintain the configuration before the configuration change.

The correction value $(y,t)$=the operational information $(y,t)$ of the analysis target virtual machine executed for the period of time to maintain the configuration before the configuration change–the operational information $(y,t)$ of the searched similar virtual machine executed for the period of time to maintain the configuration before the configuration change (10)

In Equation (10), y represents a day, and t represents time. If the operational information of the similar virtual machine executed for the period of time to maintain the configuration before the configuration change is operational information for a time period of multiple weeks, the analyzing device 204 treats an average of operational information at each time of each day of the weeks as the operational information $(y, t)$ of the similar virtual machine executed for the period of time to maintain the configuration before the configuration change.

A table 1603 represents a correction value for each time zone of each day of the weeks. A graph 1604 represents a calculated correction value. In the graph 1604, a solid line represents the operational information of the analysis target virtual machine executed for the period of time to maintain the configuration before the configuration change, and a dotted line represents the operational information of the similar virtual machine executed for the period of time to maintain the configuration before the configuration change. In the graph 1604, the operational information of the similar virtual machine executed for the period of time to maintain the configuration before the configuration change is smaller than the operational information of the analysis target virtual machine executed for the period of time to maintain the configuration before the configuration change. Thus, the correction value is negative.

Subsequently, the analyzing device 204 uses the correction value to generate estimated operational information of the analysis target virtual machine executed for the period of time to maintain the configuration after the configuration change according to the following Equation (11).

The estimated operational information $(y,t)$=operational information $(y,t)$ of the similar virtual machine executed for the period of time to maintain the configuration after the configuration change–the correction value $(y,t)$ (11)

A table 1605 represents a correction value for each time zone of each day of the weeks. A graph 1606 represents the estimated operational information. In the graph 1606, a solid line represents the operational information of the similar virtual machine, and a dotted line represents the estimated operational information. As represented by the graph 1604, the correction value is negative, and the estimated values are larger than the operational information of the similar virtual machine executed for the period of time to maintain the configuration after the configuration change.

In this manner, the analysis is executed using a virtual machine of which configuration information is the same as an analysis target virtual machine and of which a configuration change is the same as the analysis target virtual machine and of which operational information before the configuration change is similar to operational information of the analysis target virtual machine before a configuration change. Thus, even if the amount of data after the configuration change of the analysis target virtual machine is small, the analysis may be executed with high accuracy.

The reason for searching for a virtual machine of which configuration information is the same as an analysis target virtual machine and of which a configuration change is the same as the analysis target virtual machine and of which operational information before the configuration change is similar to operational information of the analysis target virtual machine before a configuration change is described with reference to FIGS. 17A, 17B, 18A, and 18B. Specifically, a case where the analysis is executed using a virtual machine of which configuration information is the same as an analysis target virtual machine and of which a configuration change is the same as the analysis target virtual machine is described with reference to FIGS. 17A and 17B. In addition, a case where the analysis is executed using a virtual machine of which operational information before the configuration change is similar to operational information of the analysis target virtual machine before a configuration change is described with reference to FIGS. 18A and 18B.

FIGS. 17A and 17B illustrate an example of the analysis executed using a virtual machine of which configuration information is the same as an analysis target virtual machine and of which a configuration change is the same as the analysis target virtual machine. FIG. 17A illustrates the example in which GuestA that is the analysis target virtual machine is migrated from HostA to HostB. A graph 1701 represents a relationship between time and CPU utilization of GuestA that is the analysis target virtual machine. In the graph 1701, a time period from a time indicated by ($y\_A\_1$, $t\_A\_1$) to a time indicated by ($y\_A\_2$, $t\_A\_2$) is a period of time to maintain the configuration before the configuration change, and the time period from the time indicated by ($y\_A\_2$, $t\_A\_2$) to a time indicated by ($y\_A\_3$, $t\_A\_3$) is a period of time to maintain the configuration after the configuration change. The graph 1701 indicates that the configuration is changed by migrating GuestA at the time indicated by ($y\_A\_2$, $t\_A\_2$), and GuestA does not sufficiently use a CPU resource for the period of time to maintain the configuration before the configuration change and sufficiently uses the CPU resource after the configuration change.

This example assumes that the accuracy of the analysis is not sufficient because the period of time to maintain the configuration after the configuration change of GuestA is short and the amount of data of the operational information log 221 after the configuration change is small. In the example illustrated in FIGS. 17A and 17B, the analysis is executed using GuestE as the virtual machine of which the configuration information is the same as the analysis target virtual machine and of which the configuration change is the same as the analysis target virtual machine.

FIG. 17B illustrates the example in which GuestE is migrated from HostC to HostD. In a graph 1702, a time period from a time indicated by ($y\_E\_1$, $t\_E\_1$) to a time indicated by ($y\_E\_2$, $t\_E\_2$) is a period of time to maintain the configuration before the configuration change, and a time period from the time indicated by ($y\_E\_2$, $t\_E\_2$) to a time indicated by ($y\_E\_3$, $t\_E\_3$) is a period of time to maintain the configuration after the configuration change. The graph 1702 indicates that the configuration is changed by migrating GuestE at the time indicated by ($y\_E\_2$, $t\_E\_2$), and GuestE does not sufficiently use a CPU resource for the period of time to maintain the configuration before the configuration change and sufficiently uses the CPU resource after the configuration change.

Regarding the same operational information as the virtual machine to be analyzed, the configuration of GuestD executed on HostB before GuestA is added is similar to the configuration of GuestH executed on HostD before GuestE is added. In addition, regarding the same configuration change as the virtual machine to be analyzed, the configuration of GuestA added is similar to the configuration of GuestE added. A trend of operational information of GuestA before the configuration change may not be similar to a trend of operational information of GuestE before the configuration change, since the similarity may be determined based on CPU utilization of GuestA in the time period from the time indicated by ($y\_A\_1$, $t\_A\_1$) to the time indicated by ($y\_A\_2$, $t\_A\_2$) and CPU utilization of GuestE in the time period from the time indicated by ($y\_E\_1$, $t\_E\_1$) to the time indicated by ($y\_E\_2$, $t\_E\_2$). Thus, even if operational information of a virtual machine of which configuration information is the same as a virtual machine to be analyzed and of which a configuration change is the same as the virtual machine to be analyzed is analyzed instead of operational information of the virtual machine to be analyzed, the accuracy of the analysis may be reduced.

FIGS. 18A and 18B illustrate an example of analysis executed using a virtual machine of which a trend of operational information is similar to the virtual machine to be analyzed before a configuration change of the virtual machine to be analyzed. FIG. 18A is the same as FIG. 17A, and a description thereof is omitted.

FIG. 18B illustrates the example in which GuestF is added to HostC on which GuestE is executed. A graph 1802 represents a relationship between time and CPU utilization of GuestE. In the graph 1802, a time period from a time indicated by ($y\_E\_1$, $t\_E\_1$) to a time indicated by ($y\_E\_2$, $t\_E\_2$) is a period of time to maintain the configuration before the configuration change, and a time period from the time indicated by ($y\_E\_2$, $t\_E\_2$) to a time indicated by ($y\_E\_3$, $t\_E\_3$) is a period of time to maintain the configuration after the configuration change. The graph 1802 indicates that GuestE sufficiently uses a CPU resource before the configuration is changed by adding GuestF at the time indicated by ($y\_E\_2$, $t\_E\_2$), and GuestE sufficiently uses the CPU resource after GuestF is added.

A trend of operational information of GuestA before the configuration change is similar to a trend of operational information of GuestE before the configuration change, since the similarity may be determined based on the CPU utilization of GuestA in the time period from the time indicated by ($y\_A\_1$, $t\_A\_1$) to the time indicated by ($y\_A\_2$, $t\_A\_2$) and the CPU utilization of GuestE in the time period from the time indicated by ($y\_E\_1$, $t\_E\_1$) to the time indicated by ($y\_E\_2$, $t\_E\_2$). However, GuestA does not sufficiently use the CPU resource before the configuration change, while GuestE sufficiently uses the CPU resource before the configuration change. Thus, the trends of the operational information of GuestA and GuestE are not similar to each other after the configuration changes. Thus, even if operational information of a virtual machine of which a trend of operational information before a configuration change is similar to a virtual machine to be analyzed is analyzed instead of operational information of the virtual machine to be analyzed, the accuracy of the analysis may be reduced.

Hereinafter, the operations described with reference to FIGS. 9 to 16 are described with reference to flowcharts of FIGS. 19 to 30.

Figure 19:
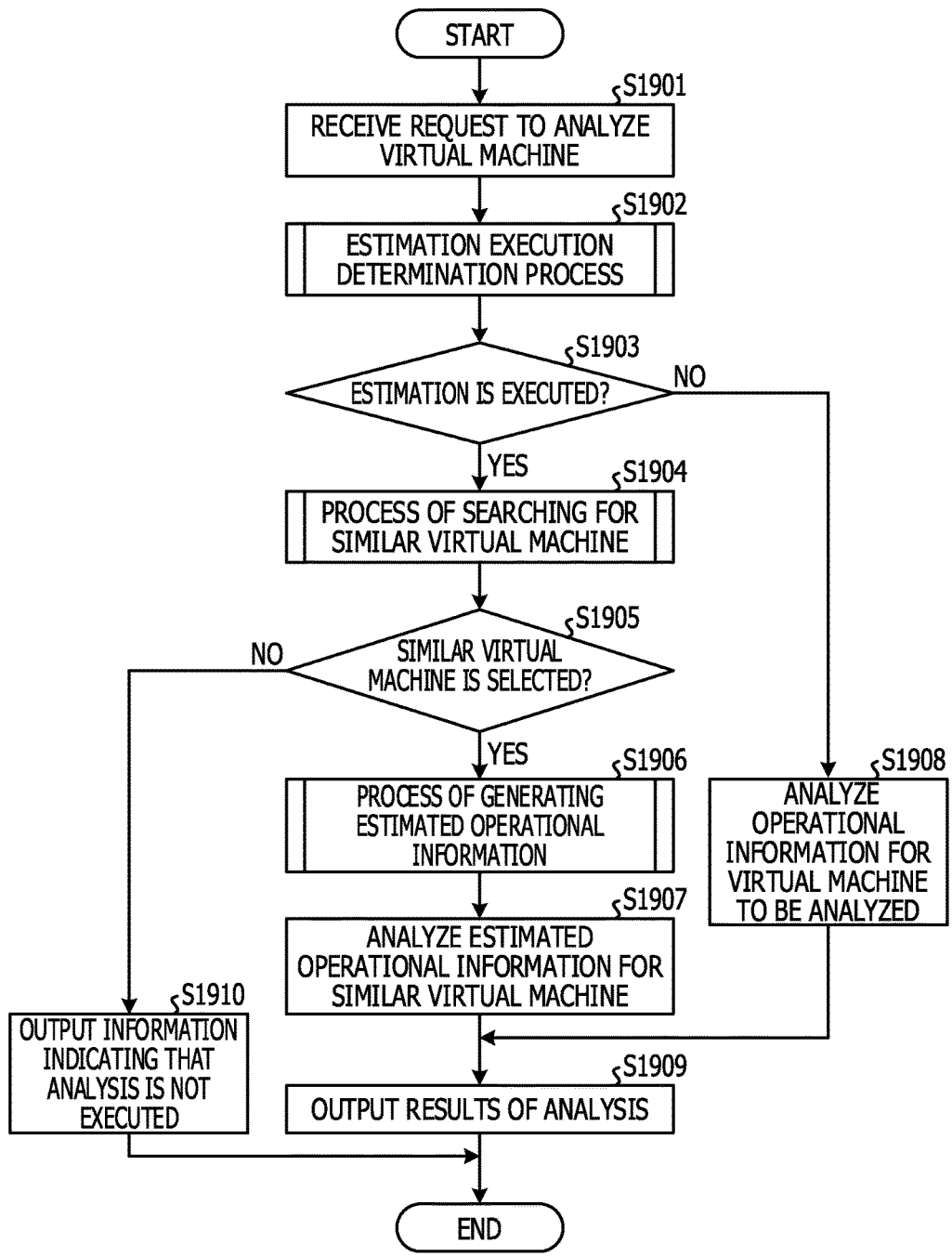
FIG. 19 is a flowchart of an example of a procedure for an analysis process.

FIG. 19 is a flowchart of an example of a procedure for the analysis process. The analysis process is to analyze performance of a virtual machine to be analyzed. The analyzing device 204 receives a request to analyze a virtual machine from the administrator apparatus 201 (in S1901). The virtual machine requested to be analyzed is referred to as a "virtual machine to be analyzed".

Next, the analyzing device 204 executes an estimation execution determination process (in S1902). Then, the analyzing device 204 determines, based on a result of the estimation execution determination process, whether or not the estimation is executed (in S1903). If the estimation is executed (Yes in S1903), the analyzing device 204 executes a process of searching for a similar virtual machine (in S1904). The process of searching for a virtual machine is described later with reference to FIG. 21.

Next, the analyzing device 204 determines, based on a result of the process of searching for a similar virtual machine, whether or not a similar virtual machine is selected (in S1905). If the similar virtual machine is selected (Yes in S1905), the analyzing device 204 executes a process of generating estimated operational information (in S1906). The process of generating estimated operational information is described later with reference to FIG. 30. Next, the analyzing device 204 analyzes the estimated operational information for the similar virtual machine (in S1907). Specific examples of the analysis are regression analysis and correlation analysis. If the estimation is not executed (No in S1903), the analyzing device 204 analyzes operational information for the virtual machine to be analyzed (in S1908).

After the process of S1907 or S1908 is terminated, the analyzing device 204 outputs results of the analysis to the administrator apparatus 201 (in S1909). If the similar virtual machine is not selected (No in S1905), the analyzing device 204 outputs information indicating that the analysis is not executed (in S1910).

After the process of S1909 or S1910 is terminated, the analyzing device 204 terminates the analysis process. The analyzing device 204 may output highly accurate results of the analysis process by executing the analysis process even if the amount of data after a configuration change of the virtual machine to be analyzed is small.

Figure 20:
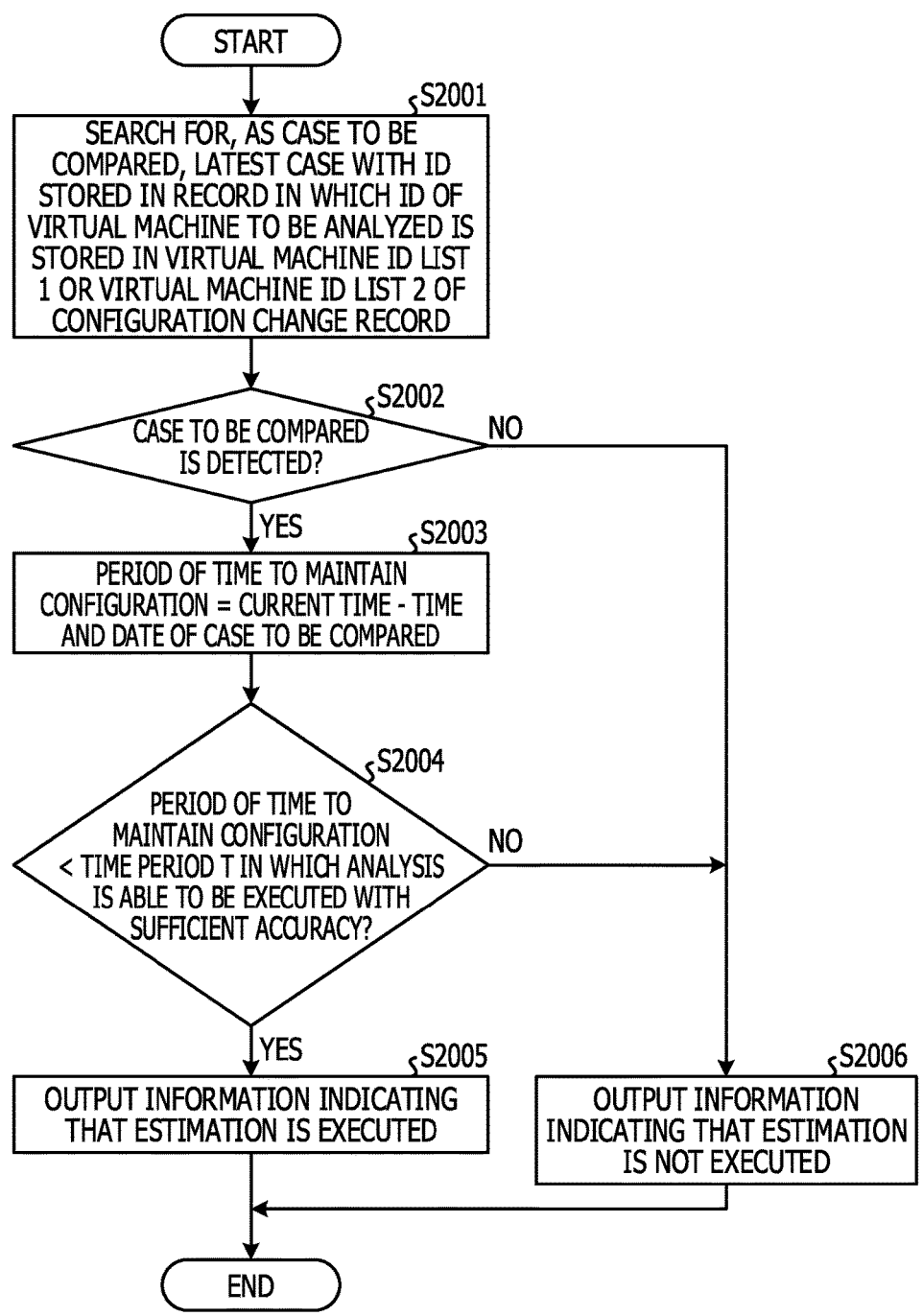
FIG. 20 is a flowchart of an example of a procedure for an estimation execution determination process.

FIG. 20 is a flowchart of an example of a procedure for the estimation execution determination process. The estimation execution determination process is a process of determining whether or not operational information of the virtual machine requested to be analyzed is estimated.

The analyzing device 204 searches for, as a case to be compared, the latest case with an ID stored in a record in which an ID of the virtual machine to be analyzed is stored in the "virtual machine ID list 1" or "virtual machine ID list 2" of the configuration change record 222 (in S2001). Next, the analyzing device 204 determines whether or not the case to be compared is detected (in S2002). If the case to be compared is detected (Yes in S2002), the analyzing device 204 calculates "a value obtained by subtracting a time of the detected case to be compared from a current time" and treats the calculated value as a period of time to maintain a configuration (in S2003). Then, the analyzing device 204 determines whether or not the period of time to maintain the configuration is shorter than the time period T in which the analysis is able to be executed with sufficient accuracy (in S2004). If the period of time to maintain the configuration is shorter than the time period T in which the analysis is able to be executed with sufficient accuracy (Yes in S2004), the analyzing device 204 outputs information indicating that the estimation is executed (in S2005).

If the case to be compared is not detected (No in S2002) or the period of time to maintain the configuration is equal to or longer than the time period T in which the analysis is able to be executed with sufficient accuracy (No in S2004), the analyzing device 204 outputs information indicating that the estimation is not executed (in S2006). If the answer to the determination of S2002 is negative, a configuration of virtual machines included in a physical machine on which the virtual machine to be analyzed is executed has not been changed, for example.

After the process of S2005 or S2006 is terminated, the analyzing device 204 terminates the estimation execution determination process. If the operational information of the virtual machine to be analyzed is sufficient, the analyzing device 204 executes the estimation execution determination process, executes the analysis using the operational information of the virtual machine to be analyzed, and may thereby improve the accuracy of the analysis. If the operational information of the virtual machine to be analyzed is not sufficient, the analyzing device 204 may improve the accuracy of the analysis by executing the analysis using operational information of the similar virtual machine.

Figure 21:
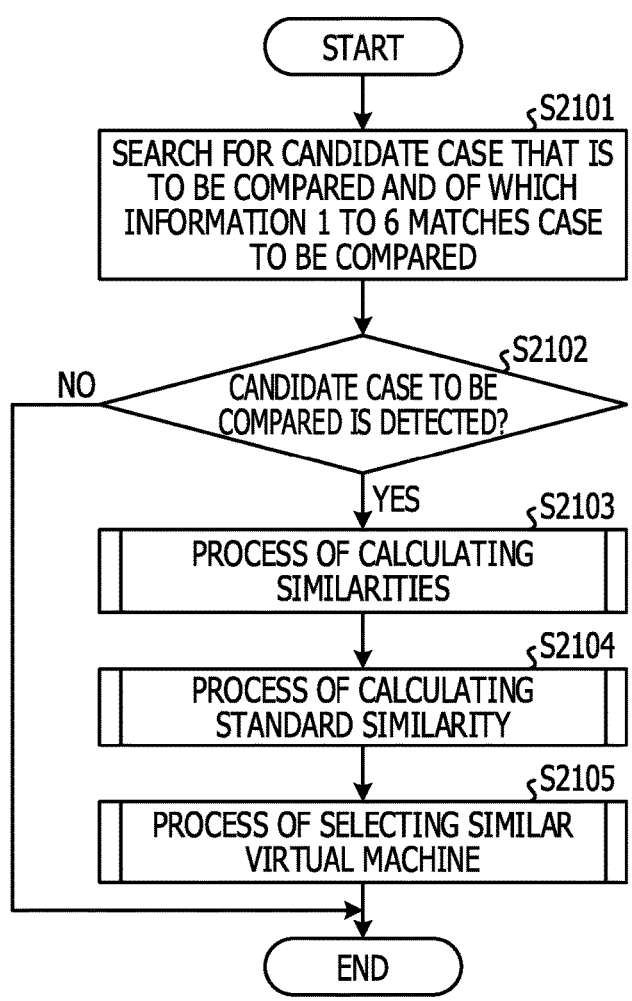
FIG. 21 is a flowchart of an example of a procedure for a process of searching for a similar virtual machine.

FIG. 21 is a flowchart of an example of a procedure for the process of searching for a similar virtual machine. The process of searching for a similar virtual machine is to search the virtual machine that is similar to the virtual machine to be analyzed. The analyzing device 204 searches for, based on the physical machine configuration information 211, the virtual machine configuration information 212, and the configuration change record 222, a candidate case that is to be compared and of which the information 1 to 6 (described with reference to FIG. 9) matches the case to be compared (in S2101).

Next, the analyzing device 204 determines whether or not the candidate case to be compared is detected (in S2102). If the candidate case to be compared is detected (Yes in S2102), the analyzing device 204 executes a process of calculating similarities (in S2103). The process of calculating similarities is described later with reference to FIG. 22. Then, the analyzing device 204 executes a process of calculating a standard similarity (in S2104). The process of calculating a standard similarity is described later with reference to FIG. 27. Next, the analyzing device 204 executes a process of selecting a similar virtual machine (in S2105). The process of selecting a similar virtual machine is described later with reference to FIG. 29. After the process of S2105 is terminated, the process of searching for a similar virtual machine is terminated.

If the candidate case to be compared is not detected (No in S2102), the analyzing device 204 terminates the process of searching for a similar virtual machine. If the answer to the determination of S2102 is negative, a similar virtual machine is not selected and the analyzing device 204 determines that the similar virtual machine is not selected (No in S1905). By executing the process of searching for a similar virtual machine, the analyzing device 204 searches for a virtual machine of which operational information is similar to the virtual machine to be analyzed.

Figure 22:
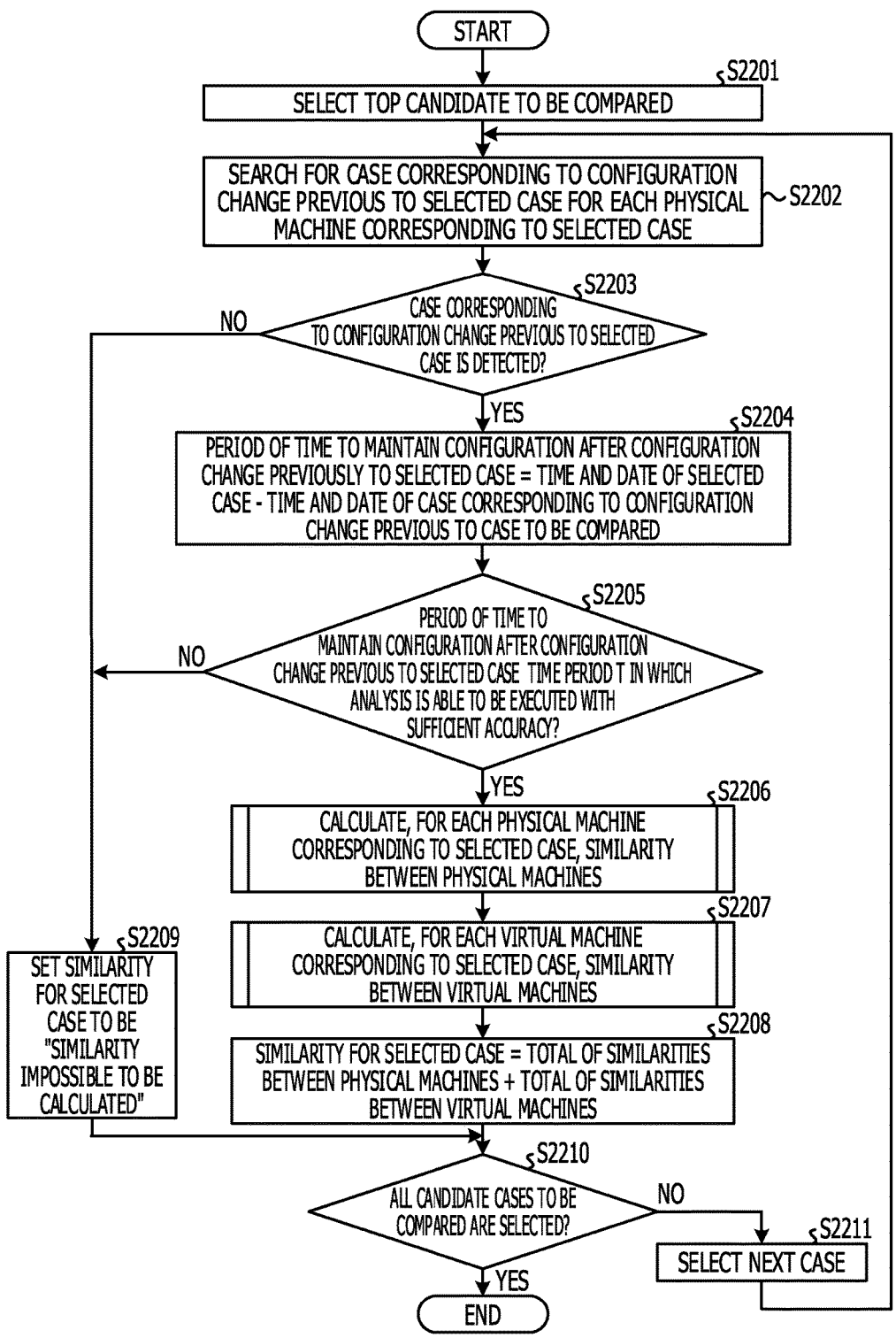
FIG. 22 is a flowchart of an example of a procedure for a process of calculating a similarity.

FIG. 22 is a flowchart of an example of a procedure for the process of calculating similarities. The process of calculating similarities is to calculate the similarities for candidate cases to be compared. The analyzing device 204 selects a candidate case to be compared and indicated at the top of the similarity list 1001 from among the candidate cases to be compared (in S2201). Next, the analyzing device 204 searches for a case corresponding to a configuration change previous to the selected case for each of physical machines corresponding to the selected case (in S2202). Subsequently, the analyzing device 204 determines whether or not the case corresponding to the configuration change previous to the selected case is detected (in S2203). If the case corresponding to the configuration change previous to the selected case is detected (Yes in S2203), the analyzing device 204 calculates "a value obtained by subtracting a time of a case corresponding to a configuration change previous to the case to be compared from a time of the selected case" and treats the calculated value as a period of time to maintain a configuration after the configuration change previous to the selected case (in S2204).

Next, the analyzing device 204 determines whether or not the period of time to maintain the configuration after the configuration change previous to the selected case is equal to or longer than the time period T in which the analysis is able to be executed with sufficient accuracy (in S2205). If the period of time to maintain the configuration after the configuration change previous to the selected case is equal to or longer than the time period T in which the analysis is able to be executed with sufficient accuracy (Yes in S2205), the analyzing device 204 executes a process of calculating similarities for the physical machines corresponding to the selected case (in S2206). The process of calculating similarities for the physical machines is described later with reference to FIG. 23. Next, the analyzing device 204 executes a process of calculating similarities for virtual machines corresponding to the selected case (in S2207). The process of calculating similarities for the virtual machines is described later with reference to FIG. 25. Subsequently, the analyzing device 204 calculates "a value obtained by adding the total of the similarities for the physical machines to the total of the similarities for the virtual machines" and treats the calculated value as a similarity for the selected case (in S2208). The process of S2208 corresponds to Equation (1).

If the case corresponding to the configuration change previous to the selected case is not detected (No in S2203) or the period of time to maintain the configuration after the configuration change previous to the selected case is shorter than the time period T in which the analysis is able to be executed with sufficient accuracy (No in S2205), the analyzing device 204 sets the similarity for the selected case to be a "similarity impossible to be calculated" (in S2209).

After the process of S2208 or S2209 is terminated, the analyzing device 204 determines whether or not all the candidate cases to be compared are selected (in S2210). If at least one of all the candidate cases to be compared is yet to be selected (No in S2210), the analyzing device 204 selects a next case (in S2211). After the process of S2211 is terminated, the analyzing device 2202 causes the process to proceed to S2202.

If all the candidate cases to be compared are selected (Yes in S2210), the analyzing device 204 terminates the process of calculating similarities. By executing the process of calculating similarities, the analyzing device 204 calculates similarities for candidate cases to be compared.

Figure 23:
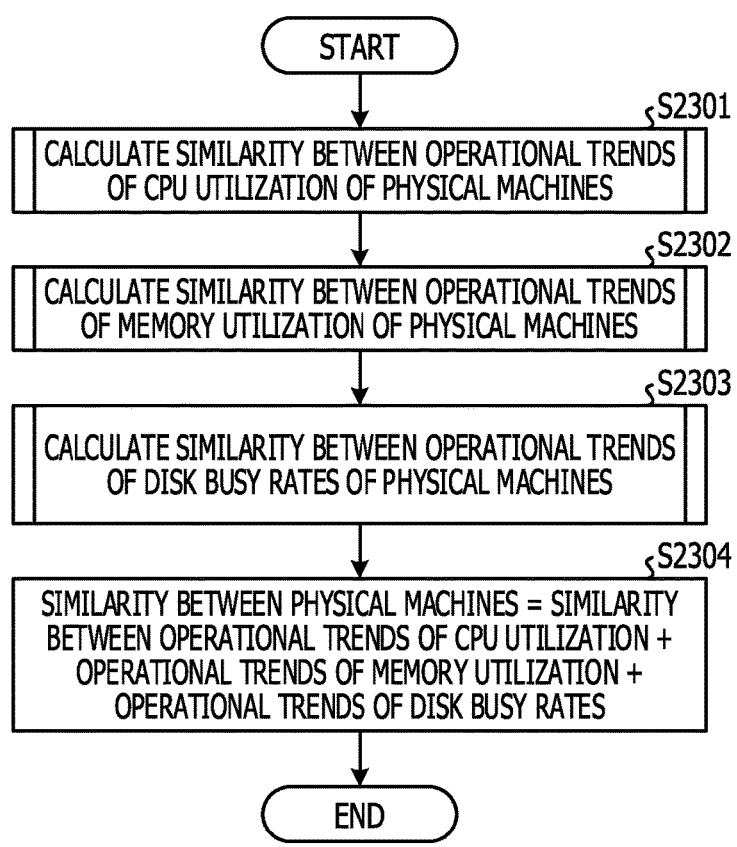
FIG. 23 is a flowchart of an example of a procedure for a process of calculating a similarity between physical machines.

FIG. 23 is a flowchart of an example of a procedure for the process of calculating a similarity between physical machines. The process of calculating a similarity between physical machines is to calculate the similarity between the physical machines. The analyzing device 204 executes a process of calculating a similarity between operational trends of CPU utilization of the physical machines (in S2301). The process of calculating a similarity between operational trends is described later with reference to FIG. 24. Next, the analyzing device 204 executes a process of calculating a similarity between operational trends of memory utilization of the physical machines (in S2302). Subsequently, the analyzing device 204 executes a process of calculating a similarity between operational trends of disk busy rates of the physical machines (in S2303).

Next, the analyzing device 204 calculates "a value obtained by summing the similarity between the operational trends of the CPU utilization, the similarity between the operational trends of the memory utilization, and the similarity between the operational trends of the disk busy rates" and treats the calculated value as the similarity between the physical machines (in S2304). The process of S2304 corresponds to Equation (2). After the process of S2304 is terminated, the analyzing device 204 terminates the process of calculating the similarity between the physical machines. By executing the process of calculating the similarity between the physical machines, the analyzing device 204 calculates the similarity between the physical machines.

Figure 24:
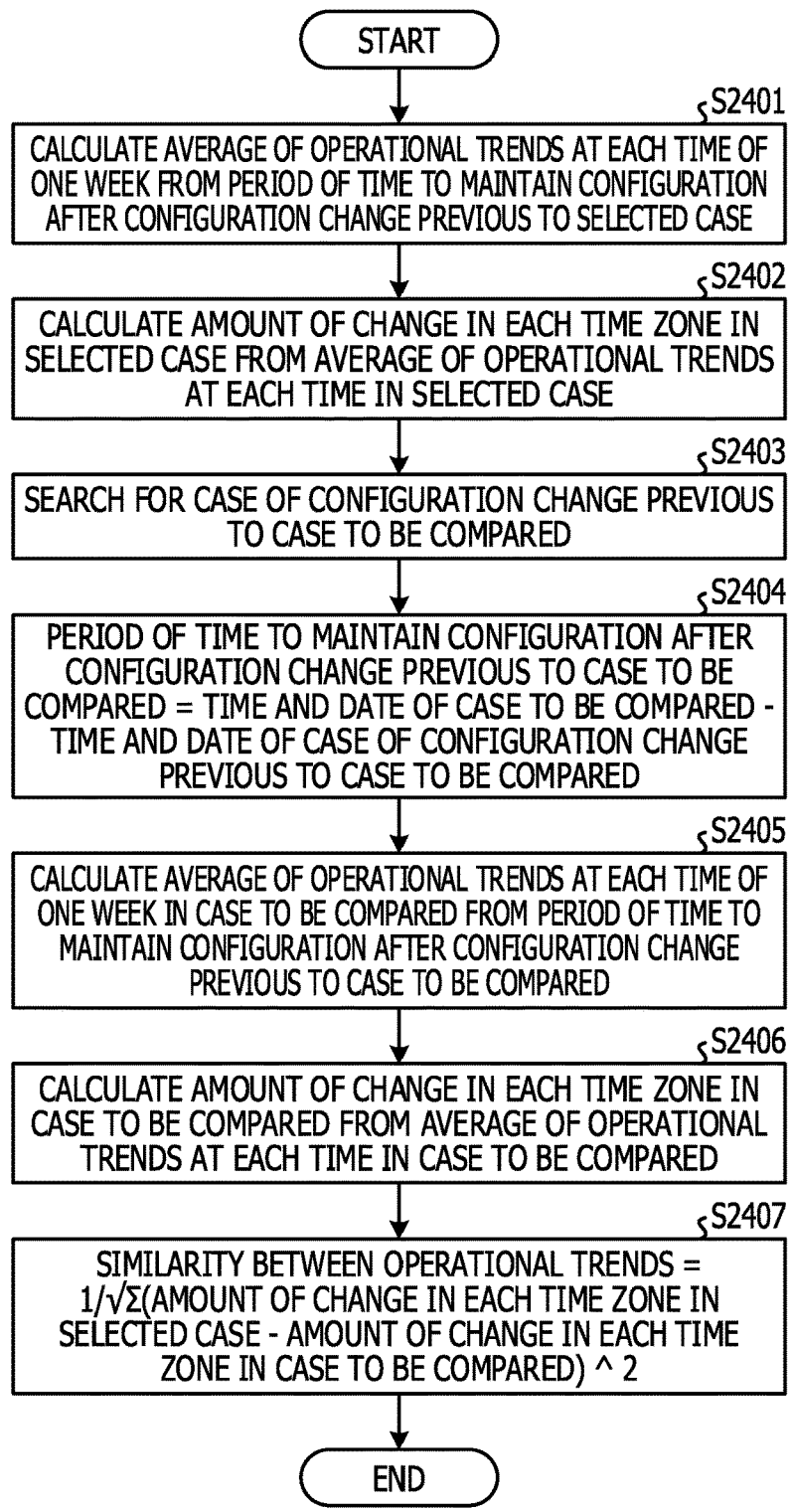
FIG. 24 is a flowchart of an example of a procedure for a process of calculating a similarity between operational trends.

FIG. 24 is a flowchart of an example of a procedure for the process of calculating a similarity between operational trends. The process of calculating a similarity between operational trends is to calculate the similarity between the operational trends. When the process of calculating a similarity between operational trends is called from the processes of S2301 to S2303, the analyzing device 204 executes the process of calculating a similarity between operational trends and thereby calculates similarities between operational trends of the physical machines. When the process of calculating a similarity between operational trends is called from the processes of S2503 to S2505, the analyzing device 204 executes the process of calculating a similarity between operational trends and thereby calculates similarities between operational trends of virtual machines.

The analyzing device 204 references the operational information log 221 and calculates an average of operational trends at each time of one week from the period of time to maintain the configuration after the configuration change previous to the selected case (in S2401). The selected case used in the process of S2401 is the case selected in the process of S2211.

Next, the analyzing device 204 calculates the amount of a change in each of the time zones in the selected case from the averages of the operational trends at each time in the selected case (in S2402). Subsequently, the analyzing device 204 references the configuration change record 222 and searches for the case corresponding to the configuration change previous to the case to be compared (in S2403). Next, the analyzing device 204 calculates "a value obtained by subtracting a time and date of the case of the configuration change previous to the case to be compared from a time and date of the case to be compared" and treats the calculated value as the period of time to maintain the configuration after the configuration change previous to the case to be compared (in S2404).

Subsequently, the analyzing device 204 calculates an average of operational trends at each time of one week in the case to be compared from the period of time to maintain the configuration after the configuration change previous to the case to be compared (in S2405). Next, the analyzing device 204 calculates the amount of a change in each time zone in the case to be compared from an average of operational trends at each time in the case to be compared (in S2406). Then, the analyzing device 204 calculates "a value of (1/Σ((the amount of a change in each time zone in the selected case)−(the amount of a change in each time zone in the case to be compared))^2)" and treats the calculated value as a similarity between the operational trends (in S2407). After the process of S2407 is terminated, the analyzing device 204 terminates the process of calculating a similarity between operational trends. By executing the process of calculating a similarity between operational trends, the analyzing device 204 calculates the similarity between the operational trends.

Figure 25:
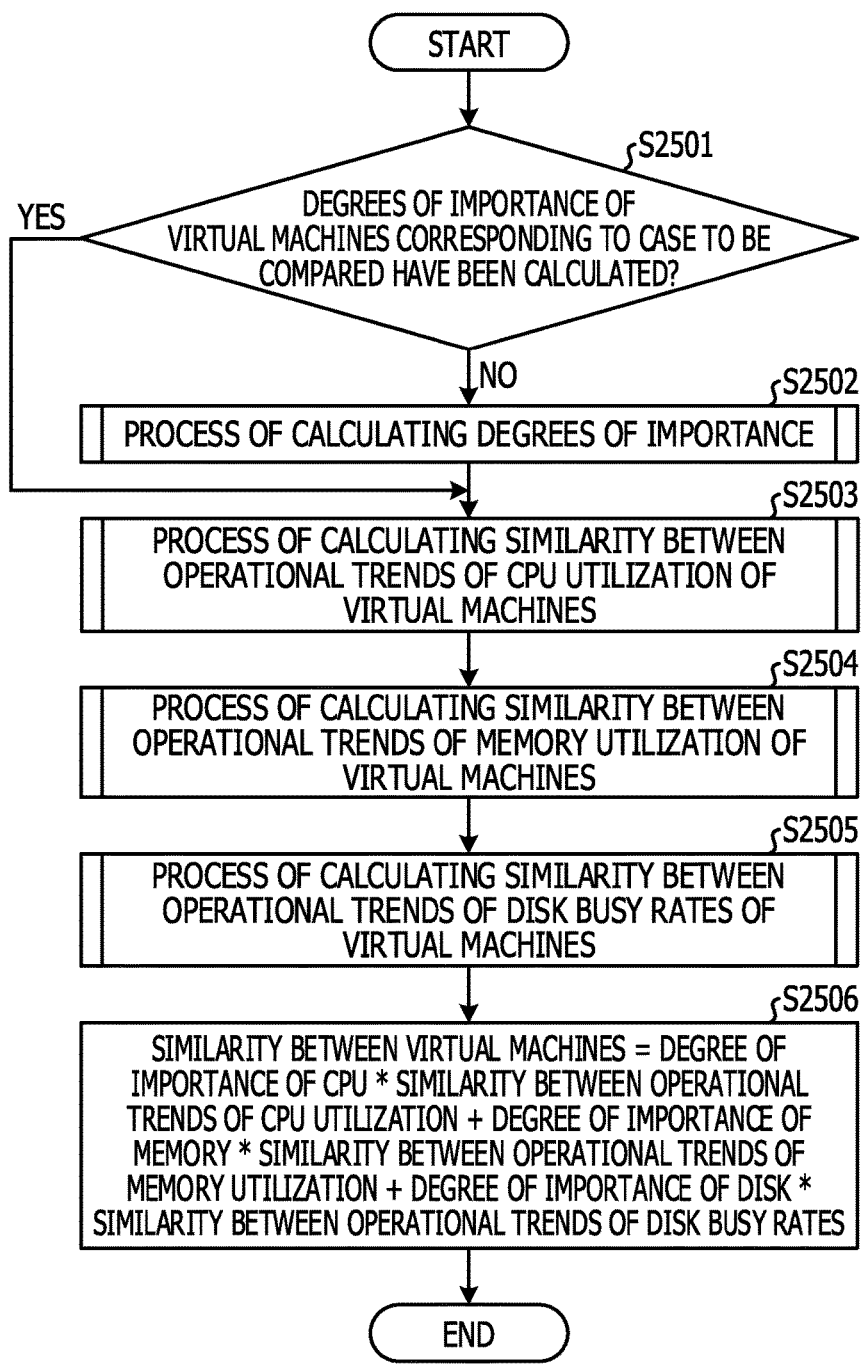
FIG. 25 is a flowchart of an example of a procedure for a process of calculating a similarity between virtual machines.

FIG. 25 is a flowchart of an example of a procedure for the process of calculating a similarity between virtual machines. The process of calculating a similarity between virtual machines is to calculate the similarity between the virtual machines. The analyzing device 204 references an importance degree list 1310 and determines whether or not degrees of importance of virtual machines corresponding to the case to be compared have already been calculated (in S2501). If the degrees of importance of the virtual machines corresponding to the case to be compared are yet to be calculated (No in S2501), the analyzing device 204 executes a process of calculating degrees of importance (in S2502). The process of calculating degrees of importance is described later with reference to FIG. 26.

After the process of S2502 is terminated or if the degrees of importance of the virtual machines corresponding to the case to be compared have already been calculated (Yes in S2501), the analyzing device 204 executes a process of calculating a similarity between operational trends of CPU utilization of the virtual machines (in S2503). Next, the analyzing device 204 executes a process of calculating a similarity between operational trends of memory utilization of the virtual machines (in S2504). Subsequently, the analyzing device 204 executes a process of calculating a similarity between operational trends of disk busy rates of the virtual machines (in S2505).

Next, the analyzing device 204 calculates "a value of (a degree of importance of a CPU*the similarity between the operational trends of the CPU utilization+a degree of importance of a memory*the similarity between the operational trends of the memory utilization+a degree of importance of a disk*the similarity between the operational trends of the disk busy rates)" and treats the calculated value as a similarity between the virtual machines (in S2506). The process of S2506 corresponds to Equation (4). After the process of S2506 is terminated, the analyzing device 204 terminates the process of calculating a similarity between virtual machines. By executing the process of calculating a similarity between virtual machines, the analyzing device 204 calculates the similarity between the virtual machines.

Figure 26:
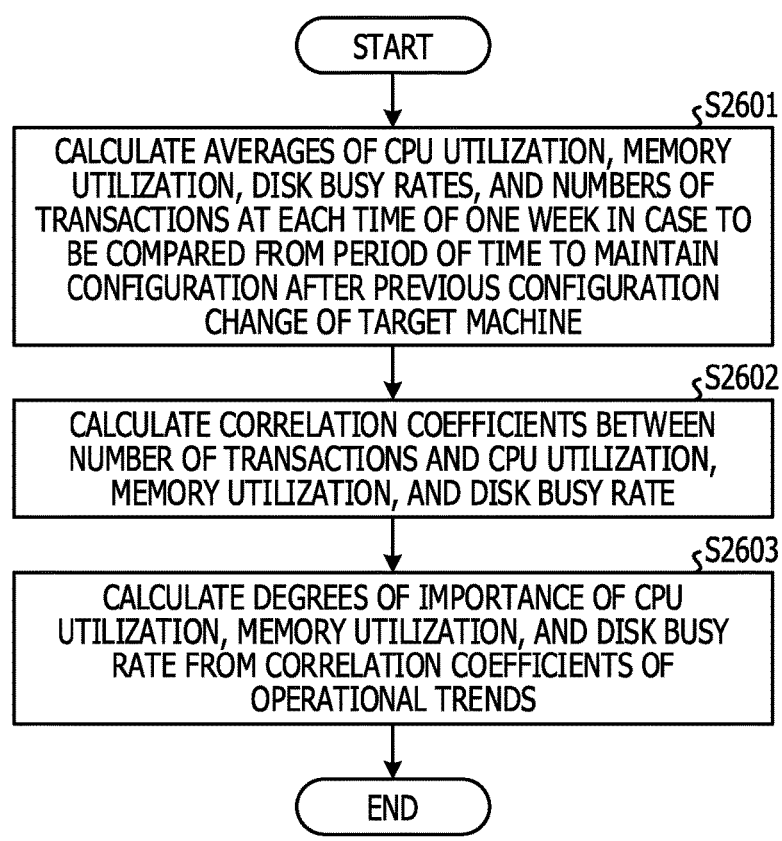
FIG. 26 is a flowchart of an example of a procedure for a process of calculating degrees of importance.

FIG. 26 is a flowchart of an example of a procedure for the process of calculating degrees of importance. The process of calculating degrees of importance is to calculate the degrees of importance. The analyzing device 204 calculates averages of CPU utilization, memory utilization, disk busy rates, and the numbers of transactions at each time of one week in the case to be compared from the period of time to maintain the configuration after the previous configuration change of a target machine (in S2601). Next, the analyzing device 204 calculates a correlation coefficient between the number of transactions and the CPU utilization, a correlation coefficient between the number of the transactions and the memory utilization, and a correlation coefficient between the number of the transactions and the disk busy rate (in S2602). Subsequently, the analyzing device 204 calculates degrees of importance of the CPU utilization, the memory utilization, and the disk busy rate from the correlation coefficients of operational trends (in S2603). A specific procedure for the calculation is given by Equation (5). After the process of S2603 is terminated, the analyzing device 204 terminates the process of calculating degrees of importance. By executing the process of calculating degrees of importance, the analyzing device 204 calculates the degrees of importance.

Figure 27:
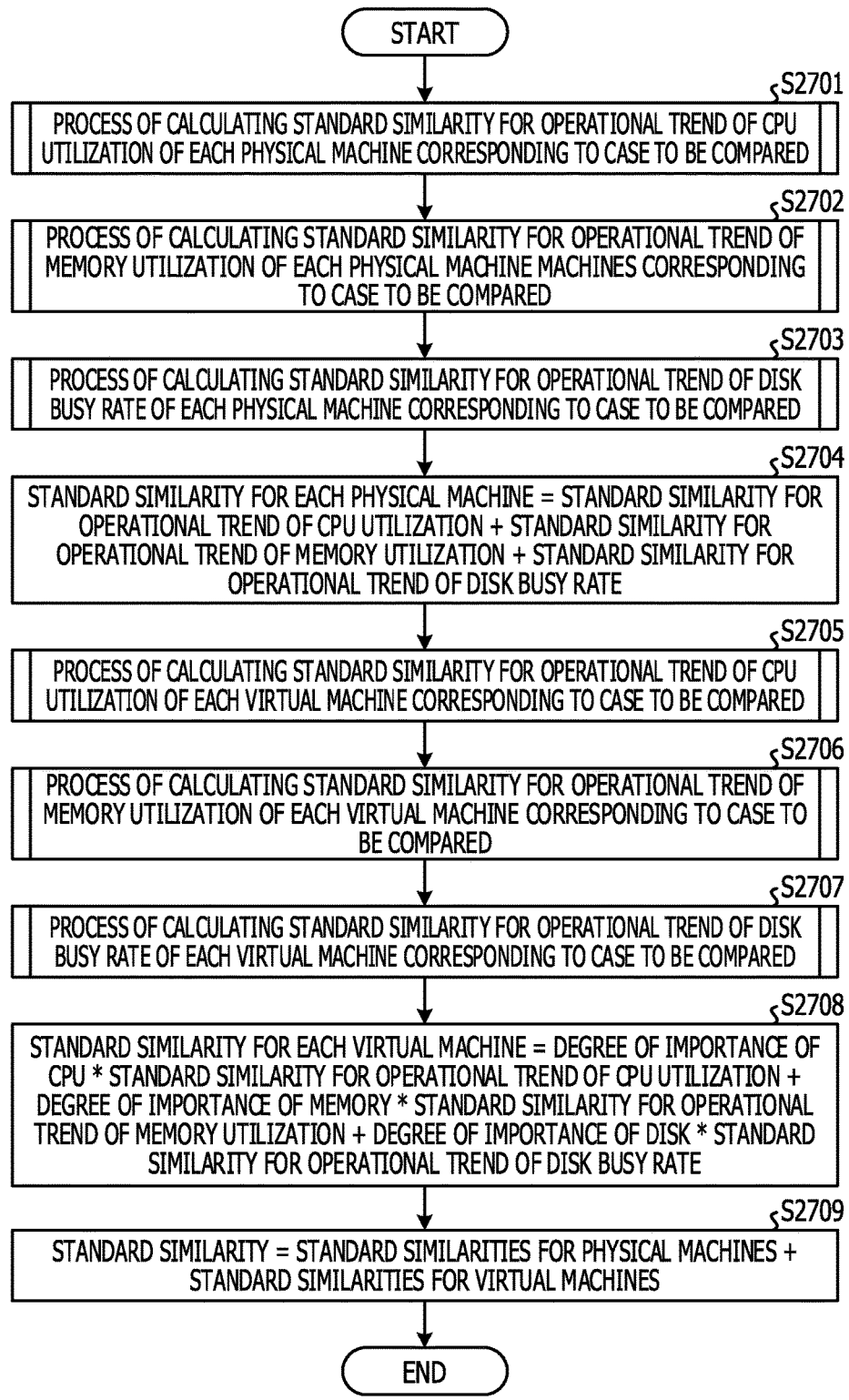
FIG. 27 is a flowchart of an example of a procedure for a process of calculating a standard similarity.

FIG. 27 is a flowchart of an example of a procedure for the process of calculating a standard similarity. The process of calculating a standard similarity is to calculate the standard similarity. The analyzing device 204 executes a process of calculating a standard similarity for an operational trend of CPU utilization of each of physical machines corresponding to the case to be compared (in S2701). The process of calculating a standard similarity for an operational trend is described later with reference to FIG. 28. Next, the analyzing device 204 executes a process of calculating a standard similarity for an operational trend of memory utilization of each of the physical machines corresponding to the case to be compared (in S2702). Subsequently, the analyzing device 204 executes a process of calculating a standard similarity for an operational trend of a disk busy rate of each of the physical machines corresponding to the case to be compared (in S2703). Next, the analyzing device 204 calculates, for each of the physical machines, "a value of (a standard similarity for an operational trend of CPU utilization+a standard similarity for an operational trend of memory utilization+a standard similarity for an operational trend of a disk busy rate)" and treats the calculated values as standard similarities for the physical machines (in S2704). The process of S2704 corresponds to Equation (7).

Subsequently, the analyzing device 204 executes a process of calculating a standard similarity for an operational trend of CPU utilization of each of the virtual machines corresponding to the case to be compared (in S2705). Next, the analyzing device 204 executes a process of calculating a standard similarity for an operational trend of memory utilization of each of the virtual machines corresponding to the case to be compared (in S2706). Then, the analyzing device 204 executes a process of calculating a standard similarity for an operational trend of a disk busy rate of each of the virtual machines corresponding to the case to be compared (in S2707). Next, the analyzing device 204 calculates, for each of the virtual machines, "a value of (a degree of importance of a CPU*a standard similarity for an operational trend of CPU utilization+a degree of importance of a memory*a standard similarity for an operational trend of memory utilization*a degree of importance of a disk*a standard similarity for an operational trend of a disk busy rate)" and treats the calculated values as standard similarities for the virtual machines (in S2708). The process of S2708 corresponds to Equation (8).

Subsequently, the analyzing device 204 calculates "a value of (the standard similarities for the physical machines+the standard similarities for the virtual machines)" and treats the calculated value as a standard similarity (in S2709). The process of S2709 corresponds to Equation (9). After the process of S2709 is terminated, the analyzing device 204 terminates the process of calculating a standard similarity. By executing the process of calculating a standard similarity, the analyzing device 204 calculates the standard similarity.

Figure 28:
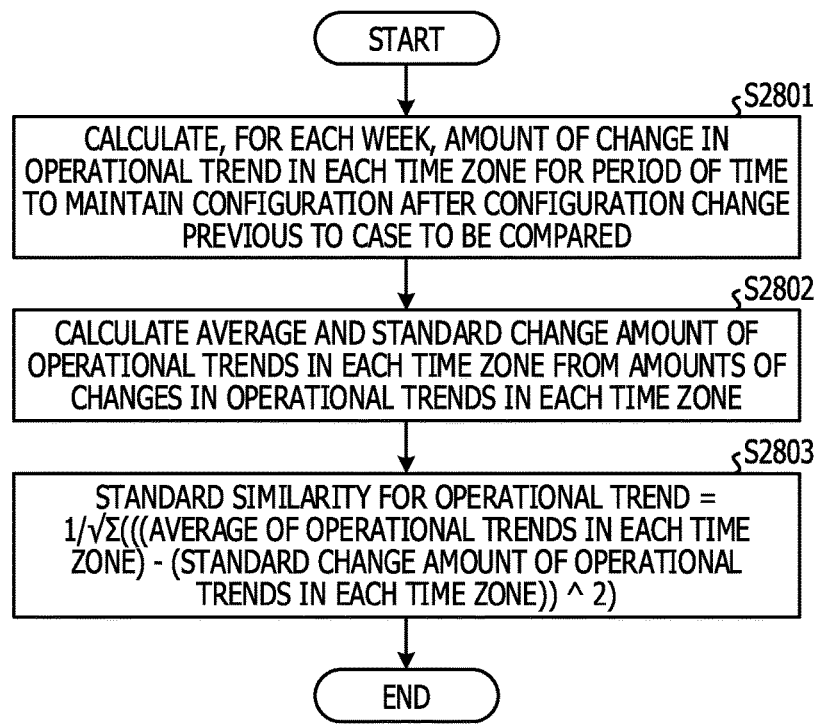
FIG. 28 is a flowchart of an example of a procedure for a process of calculating a standard similarity for an operational trend.

FIG. 28 is a flowchart of an example of a procedure for the process of calculating a standard similarity for an operational trend. The process of calculating a standard similarity for an operational trend is to calculate the standard similarity for the operational trend. The analyzing device 204 calculates, for each week, the amount of a change in an operational trend in each time zone for the period of time to maintain the configuration after the configuration change previous to the case to be compared (in S2801). Next, the analyzing device 204 calculates an average and standard change amount of operational trends in each time zone from the amounts of changes in operational trends in each time zone (in S2802). Subsequently, the analyzing device 204 calculates "a value of (1/Σ(an average of operational trends in each time zone−a standard change amount of operational trends in each time zone)^2)" and treats the calculated value as the standard similarity for the operational trend (in S2803). The process of S2803 corresponds to Equation (9).

After the process of S2803 is terminated, the analyzing device 204 terminates the process of calculating a standard similarity for an operational trend. By executing the process of calculating a standard similarity for an operational trend, the analyzing device 204 calculates the standard similarity for the operational trend.

Figure 29:
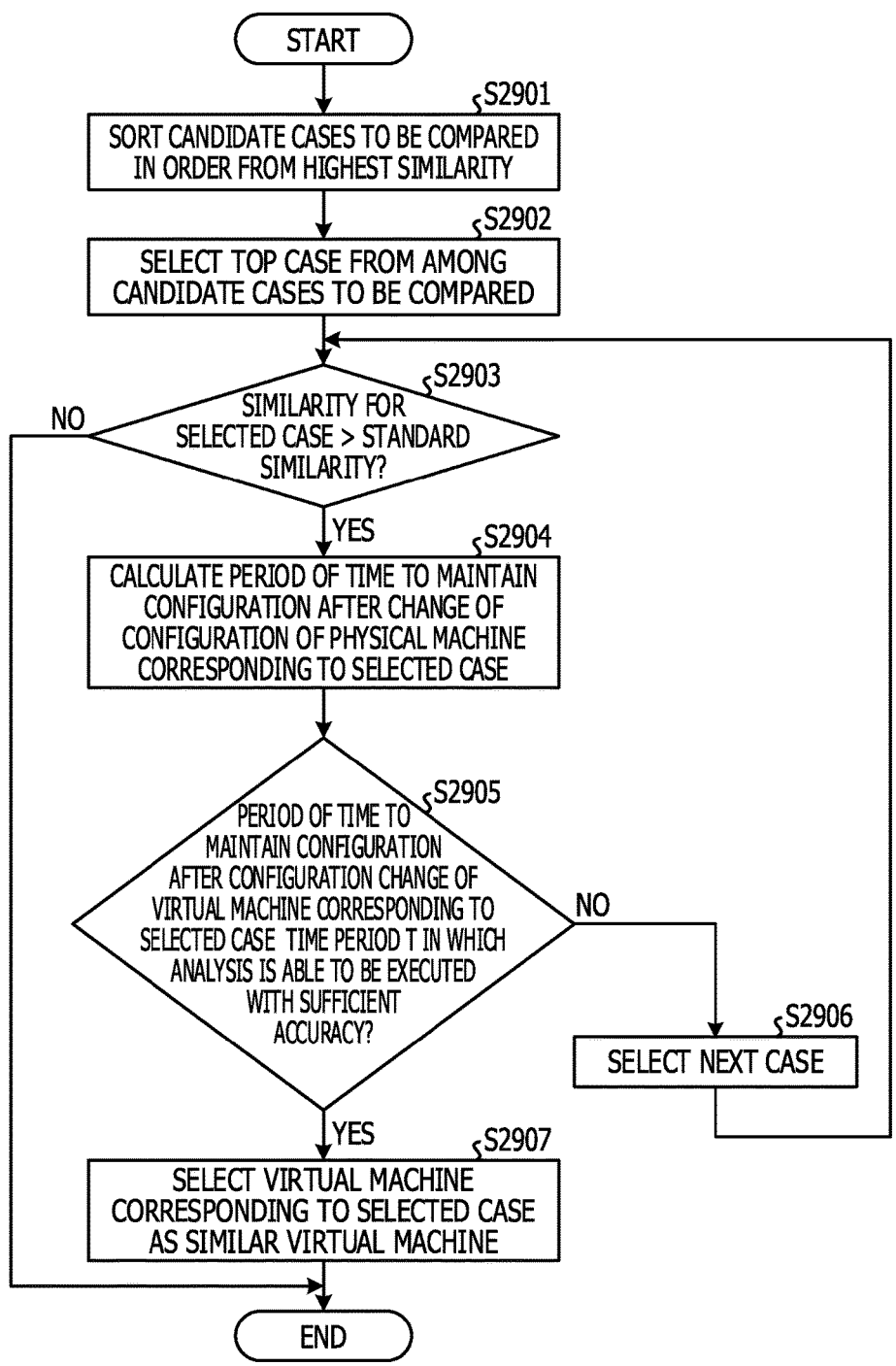
FIG. 29 is a flowchart of an example of a procedure for a process of selecting a similar virtual machine.

FIG. 29 is a flowchart of an example of a procedure for the process of selecting a similar virtual machine. The process of selecting a similar virtual machine is to select the virtual machine of which operational information is similar to the virtual machine to be analyzed.

The analyzing device 204 sorts candidate cases that are to be compared and indicated in the similarity list 1001 in order from the highest similarity (in S2901). Next, the analyzing device 204 selects a case indicated at the top of the similarity list 1001 from among the candidate cases to be compared (in S2902). Subsequently, the analyzing device 204 determines whether or not the similarity for the selected case is larger than the standard similarity (in S2903). If the similarity for the selected case is larger than the standard similarity (Yes in S2903), the analyzing device 204 calculates a period of time to maintain a configuration of a physical machine corresponding to the selected case after a change of the configuration of the physical machine corresponding to the selected case (in S2904). A specific example of the calculation is described above with reference to FIG. 15.

Next, the analyzing device 204 determines whether or not a period of time to maintain the configuration after a configuration change of a virtual machine corresponding to the selected case is equal to or longer than the time period T in which the analysis is able to be executed with sufficient accuracy (in S2905). If the period of time to maintain the configuration after the configuration change of the virtual machine corresponding to the selected case is shorter than the time period T in which the analysis is able to be executed with sufficient accuracy (No in S2905), the analyzing device 204 selects a next case among the candidate cases to be compared (in S2906). After the process of S2906 is terminated, the analyzing device 204 causes the process to return to S2903.

On the other hand, if the period of time to maintain the configuration after the configuration change of the virtual machine corresponding to the selected case is equal to or longer than the time period T in which the analysis is able to be executed with sufficient accuracy (Yes in S2905), the analyzing device 204 selects, as a similar virtual machine, the virtual machine corresponding to the selected case (in S2907). After the process of S2907 is terminated, the analyzing device 204 terminates the process of selecting a similar virtual machine.

If the similarity for the selected case is equal to or smaller than the standard similarity (No in S2903), the analyzing device 204 does not select a similar virtual machine and terminates the process of selecting a similar virtual machine. If the answer to the determination of S2903 is negative, the analyzing device 204 does not select a similar virtual machine in S1905 or the answer to the determination of S1905 is negative. By executing the process of selecting a similar virtual machine, the analyzing device 204 selects the virtual machine of which operational information is similar to the virtual machine to be analyzed.

FIG. 30 is a flowchart of an example of the process of generating estimated operational information. The process of generating estimated operational information is to generate the estimated operational information for a period of time to maintain a configuration after a configuration change.

The analyzing device 204 calculates an average of operational information in each time zone of one week from operational information for a period of time to maintain a configuration before a configuration change of the virtual machine to be analyzed (in S3001). Next, the analyzing device 204 calculates an average of operational information in each time zone of one week from operational information for a period of time to maintain a configuration of the similar virtual machine (in S3002). Subsequently, the analyzing device 204 calculates, for each time zone, a difference between an average of operational information of the virtual machine to be analyzed and an average of operational information of the similar virtual machine as a correction value (in S3003). The process of S3003 corresponds to Equation (10).

Next, the analyzing device 204 acquires operational information after a configuration change of the similar virtual machine (in S3004). Then, the analyzing device 204 generates estimated operational information that is an estimated value obtained by subtracting the correction value from operational information after the configuration change of the similar virtual machine (in S3005). The process of S3005 corresponds to Equation (11). After the process of S3005 is terminated, the analyzing device 204 terminates the process of generating estimated operational information. By executing the process of generating estimated operational information, the analyzing device 204 generates the estimated operational information for a period of time to maintain a configuration after a configuration change.

As described above, the analyzing device 204 searches for a virtual machine of which operational information before a change is similar to a virtual machine to be analyzed from among virtual machines executed on a physical machine of which a configuration of virtual machines before and after the change is similar to a physical machine on which the virtual machine to be analyzed is executed. Thus, the analyzing device 204 may search for a virtual machine of which an operational trend is similar to the virtual machine that is to be analyzed and is executed on the physical machine after the change, and the accuracy of the analysis may be improved. It is assumed that a time period in which resource utilization of a similar virtual machine after a change is measured is shorter than the predetermined time period, but is longer than a time period in which resource utilization of an analysis target virtual machine after the change. Based on this assumption, the analyzing device 204 may not temporarily execute the analysis and may execute the analysis when the time period in which the resource utilization of the similar virtual machine after the change exceeds the predetermined time period. Thus, the analyzing device 204 may execute the analysis within a time period that is shorter than a period of time to sufficiently accumulate data of the virtual machine to be analyzed.

If a similar virtual machine is searched, the analyzing device 204 may output operational information of the similar virtual machine executed on the second physical machine after the change. By executing analysis using the output operational information, the analyzing device 204 may improve the accuracy of the analysis.

If a time period in which utilization included in operational information of the analysis target virtual machine after the change is shorter than the predetermined time period, the analyzing device 204 may search for a similar virtual machine. Thus, the analyzing device 204 executes the analysis using operational information of the similar virtual machine after the change only if the operational information of the analysis target virtual machine after the change is not sufficient. Thus, the analyzing device 204 may improve the accuracy of the analysis more than analysis executed using operational information of the similar virtual machine after the change.

The analyzing device 204 may treat, as a similar virtual machine among virtual machines of which operational information is similar to the analysis target virtual machine before the change, a virtual machine that is executed on the second physical machine after the change and for which a time period in which utilization included in operational information of the virtual machine after the change is measured is equal to or longer than the predetermined time period. Thus, the amount of the operational information of the similar virtual machine after the change is sufficient, and the accuracy of the analysis may be improved.

The analyzing device 204 may calculate utilization of the analysis target virtual machine after the change based on differences between utilization of hardware resources of the analysis target virtual machine before the change and utilization of hardware resources of the similar virtual machine before the change and utilization of hardware resources of the similar virtual machine after the change. Thus, the analyzing device 204 may improve the accuracy of the analysis more than analysis executed using resource utilization of the similar virtual machine after the change.

The analyzing device 204 may search for a physical machine of which the type of a change matches a change of the first physical machine and that includes a virtual machine having a configuration similar to a configuration of a virtual machine changed on the first physical machine and of which the configuration after the change is similar to the first physical machine after the change. Thus, the analyzing device 204 does not determine whether or not a configuration of a virtual machine that is not changed before the change is similar to a virtual machine to be analyzed, and the amount of data to be processed in the process of searching for the second physical machine may be reduced.

The analyzing device 204 may search for a physical machine of which types of software match types of software executed by virtual machines executed on the first physical machine before and after the change. In addition, the analyzing device 204 may search for a physical machine that has hardware resources that are assigned to virtual machines executed on the physical machine before and after the change and of which the amounts are close to the amounts of hardware resources assigned to the virtual machines executed on the first physical machine before and after the change. Furthermore, the analyzing device 204 may search for a physical machine provided with hardware resources of which the amounts are close to the amounts of hardware resources included in the first physical machine. Thus, the analyzing device 204 may search for a virtual machine of which operational information is similar to an analysis target machine after the change.

The analyzing device 204 may update the second configuration information based on a configuration of a physical machine after a change of a virtual machine in response to the change of the virtual machine executed on the physical machine. Thus, the analyzing device 204 may reduce the amount of data of the operational information log 221 and suppress a load of a storage resource.

The analyzing device 204 may search for, as a similar virtual machine, a virtual machine of which a configuration is similar to an analysis target virtual machine and of which operational information before a change is similar to the analysis target virtual machine before the change. Thus, the analyzing device 204 may search for a similar virtual machine of which an operational trend is similar to an analysis target virtual machine executed on a physical machine after a change since the configuration of the similar virtual machine is similar to the analysis target virtual machine.

The analysis support method described in the embodiment may be achieved by causing a computer such as a personal computer or a workstation to execute a prepared program. The analysis support program is stored in a computer-readable recording medium such as a hard disk, a flexible disk, a CD-ROM, an MO disc, or a DVD. The analysis support program is read from the recording medium by the computer and executed by the computer. The analysis support program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An analysis support method executed by a computer, the analysis support method comprising:
   by the computer,
   first searching, in configuration identification information that identifies configuration values indicating identification of software, hardware resource specification, and hardware resource utilization of physical machines and virtual machines executed on the physical machines, before and after respective changes of virtual machines on the physical machines and of the virtual machines respectively executed on the physical machines, for a second physical machine that has configuration identification information which configuration values of software, hardware resource specification and hardware resource utilization are similar to configuration values of a first physical machine, on which configuration identification information of a first virtual machine to be analyzed for migration is executed, before and after a change of a state of at least one virtual machine among virtual machines executed on the second physical machine;

second searching in the configuration identification information for a second virtual machine among the at least one virtual machine that is executed on the second physical machine and which configuration values of software, hardware resource specification and hardware resource utilization are similar to configuration values of software, hardware resource specification and hardware resource utilization of the first virtual machine, before and after the change of the state of the second virtual machine executed on the second physical machine, to output information for execution of a process to control the migration of the first virtual machine, in response to the first and second searching; and performing analysis processing that analyzes operational trends of the virtual machines by using the hardware resource utilization of the first virtual machine and the hardware resource utilization of the second virtual machine.

2. The analysis support method by the computer according to claim 1, wherein the configuration identification information includes first and second configuration identification information, and the first searching for the second physical machine searches based on the first configuration identification information for configuration values of the first physical machine before and after a change of a state of another virtual machine, different from the first virtual machine, included in the virtual machines executed on the first physical machine and the second searching searches the second configuration identification information for configuration values of the second physical machine before and after the change of the state of the at least one virtual machine executed on the second physical machine.

3. The analysis support method according to claim 2, wherein the first configuration identification information includes information identifying a virtual machine of which a state is changed on the first physical machine and a type of the change, and the second configuration identification information includes information identifying a virtual machine of which a state is changed on the second physical machine and the type of the change, and wherein the first searching of the second physical machine searches for the second physical machine by searching for, based on the first configuration identification information and the second configuration identification information, a physical machine of which the type of a change matches the first physical machine and which has a configuration value similar to a configuration value of the first physical machine after the change of the state of the other virtual machine and includes a virtual machine having a configuration value similar to a configuration value of the at least one virtual machine of which the state is changed on the first physical machine.

4. The analysis support method according to claim 2, wherein the first configuration identification information includes types of software executed by virtual machines executed on the first physical machine before and after the change of the state of the other virtual machine, amounts of hardware resources assigned to the virtual machines, and amounts of hardware resources included in the first physical machine, and the second configuration identification information includes types of software executed by virtual machines executed on the physical machine before and after the change of the state of the virtual machine, the amounts of hardware resources assigned to the virtual machines, and the amounts of hardware resources included in the physical machine, and wherein the first searching of the second physical machine searches for the second physical machine by searching for, based on the first configuration identification information and the second configuration identification information, a physical machine of which types of software match the types of the software executed by the at least one virtual machines executed on the first physical machine before and after the change of the state of the other virtual machine and that has hardware resources that are assigned to virtual machines executed on the physical machine before and after the change of the state of the other virtual machine and of which the amounts of hardware resources are close to the amounts of hardware resources assigned to virtual machines executed on the first physical machine and that includes hardware resources of which the amounts are close to the hardware resources included in the first physical machine.

5. The analysis support method according to claim 2, further comprising:

updating the second configuration identification information based on the change of the state of the at least one virtual machine executed on the second physical machine and the configuration of the second physical machine after the change of the state of the at least one virtual machine, wherein the first searching of the second physical machine searches for the second physical machine based on the first configuration identification information and the second configuration identification information updated.

6. The analysis support method by the computer according to claim 1, wherein the first searching for the second physical machine, searches for the second physical machine based on operational information that identifies resource utilization values of the virtual machines, and searches for a resource utilization value of the first virtual machine before a change of a state of other virtual machine, different from the first virtual machine, included in the virtual machines executed on the first physical machine and operational information that identifies resource utilization values of the virtual machines, for a resource utilization value of the at least one virtual machine executed on the second physical machine before the change of the state of the other virtual machine.

7. The analysis support method by the computer according to claim 6, wherein the operational information of the first virtual machine includes an utilization of the hardware resource of the first physical machine used per unit of time by the first virtual machine, the analysis support method by the computer further comprising:

determining a time period in which the utilization included in the operational information of the first virtual machine is measured after the change of the state of the other virtual machine, and wherein the first searching of the second physical machine searches for the second physical machine when determined that the time period in which the utilization is measured is shorter than a threshold.

8. The analysis support method by the computer according to claim 7, wherein the operational information of the second virtual machine includes utilization of a hardware resource included in the second physical machine and used per unit of time by the second virtual machine executed on the second physical machine, and wherein the second searching of the second virtual machine searches, in the operational information of the first virtual machine before the change of the state of the other virtual machine and in the operational information of the second virtual machine executed on the second physical machine before and after the change of the state of the second virtual machine, for the second virtual machine which resource utilization value before and after the change of the state of the second virtual machine is similar to the resource utilization value of the first virtual machine and for which a time period in which the utilization included in the operational information of the second virtual machine executed on the second physical machine after the change of the state of the second virtual machine is measured is equal to or longer than the threshold.

9. The analysis support method according to claim 8, further comprising:

calculating the utilization value included in the operational information of the first virtual machine after the change of the state of the other virtual machine based on a difference between the utilization value included in the operational information of the first virtual machine before the change of the state of the other virtual machine and the utilization value included in operational information of the second virtual machine before the change of the state of the other virtual machine and based on the utilization value included in operational information of the second virtual machine after the change of the state of the other virtual machine.

10. The analysis support method according to claim 1, wherein the second searching of the second virtual machine searches for, based on operational information that identifies resource utilization values of the virtual machines, for a resource utilization value of the first virtual machine before a change of a state of other virtual machine and operational information that identifies resource utilization values of the virtual machines, for a resource utilization value of the at least one virtual machine executed on the second physical machine before the change of the state of the other virtual machine, the second virtual machine having a resource utilization value similar to a resource utilization value of the first virtual machine.

11. An analysis support computer, comprising:

a memory; and a processor coupled to the memory and configured to:

first search, in configuration identification information that identifies configuration values indicating identification of software, hardware resource specification, and hardware resource utilization of physical machines and virtual machines executed on the physical machines, before and after respective changes of virtual machines on the physical machines and of the virtual machines respectively executed on the physical machines, for a second physical machine that has configuration identification information which configuration values of software, hardware resource specification and hardware resource utilization are similar to configuration values of a first physical machine, on which configuration identification information of a first virtual machine to be analyzed for migration is executed, before and after a change of a state of at least one virtual machine among virtual machines executed on the second physical machine, second search in the configuration identification information for a second virtual machine among the at least one virtual machine that is executed on the second physical machine and which configuration values of software, hardware resource specification and hardware resource utilization are similar to configuration values of software, hardware resource specification and hardware resource utilization of the first virtual machine, before and after the change of the state of the second virtual machine executed on the second physical machine, to output information for execution of a process to control the migration of the first virtual machine, in response to the first and second searching, and perform analysis processing that analyzes operational trends of the virtual machines by using the hardware resource utilization of the first virtual machine and the hardware resource utilization of the second virtual machine.

12. The analysis support computer according to claim 11, wherein the configuration identification information includes first and second configuration identification information, and the first search for the second physical machine searches, based on the first configuration identification information, for configuration values of the first physical machine before and after a change of a state of another virtual machine, different from the first virtual machine, included in the virtual machines executed on the first physical machine and the second search searches the second configuration identification information for configuration values of the second physical machine before and after the change of the state of the at least one virtual machine executed on the second physical machine.

13. The analysis support computer according to claim 11, wherein the first search for the second physical machine, searches in operational information that identifies resource utilization values of the virtual machines, and searches for a resource utilization value of the first virtual machine before a change of a state of other virtual machine, different from the first virtual machine, included in the virtual machines executed on the first physical machine and searches in operational information that identifies resource utilization values of the virtual machines, for a resource utilization value of the at least one virtual machine executed on the second physical machine before the change of the state of the other virtual machine.

14. The analysis support computer according to claim 13, wherein the operational information of the first virtual machine includes a utilization of the hardware resource of the first physical machine used per unit of time by the first virtual machine, wherein the processor is configured to:
- determine a time period in which the utilization included in the operational information of the first virtual machine is measured after the change of the state of the other virtual machine, and
- the first search searches for the second physical machine when determined that the time period in which the utilization is measured is shorter than a threshold.

15. The analysis support computer according to claim 13, wherein the processor is configured to search for, based on the operational information of the first virtual machine before the change of the state of the other virtual machine and the operational information of the virtual machine executed on the second physical machine before the change of the state of the virtual machine, for the second virtual machine which resource utilization value before and after the change of the state of the second virtual machine is similar to the resource utilization value of the first virtual machine before and after the change of the state of the virtual machine.

16. A non-transitory computer-readable recording medium storing a program that causes a computer to execute a process, the process comprising:
- first searching, in configuration identification information that identifies configuration values indicating identification of software, hardware resource specification, and hardware resource utilization of physical machines and virtual machines executed on the physical machines, before and after respective changes of virtual machines on the physical machines and of the virtual machines respectively executed on the physical machines, for a second physical machine that has configuration identification information which configuration values of software, hardware resource specification and hardware resource utilization are similar to configuration values of a first physical machine, on which configuration identification information of a first virtual machine to be analyzed for migration is executed, before and after a change of a state of at least one virtual machine among virtual machines executed on the second physical machine;
- second searching in the configuration identification information for a second virtual machine among the at least one virtual machine that is executed on the second physical machine and which configuration values of software, hardware resource specification and hardware resource utilization are similar to configuration values of software, hardware resource specification and hardware resource utilization of the first virtual machine, before and after the change of the state of the second virtual machine executed on the second physical machine, to output information for execution of a process to control the migration of the first virtual machine, in response to the first and second searching; and
- performing analysis processing that analyzes operational trends of the virtual machines by using the hardware resource utilization of the first virtual machine and the hardware resource utilization of the second virtual machine.

* * * * *